United States Patent
Mishra et al.

(10) Patent No.: US 8,199,670 B2
(45) Date of Patent: Jun. 12, 2012

(54) TELECOMMUNICATIONS SERVICE MANAGEMENT

(75) Inventors: Richard Mishra, London (GB);
Elizabeth Graves Tector, Sammamish, WA (US)

(73) Assignee: Amdocs Systems Limited, Bath (GB)

( * ) Notice: Subject to any disclaimer, the term of this patent is extended or adjusted under 35 U.S.C. 154(b) by 995 days.

(21) Appl. No.: 12/089,531

(22) PCT Filed: Oct. 6, 2006

(86) PCT No.: PCT/GB2006/003741
§ 371 (c)(1),
(2), (4) Date: Jul. 21, 2008

(87) PCT Pub. No.: WO2007/042779
PCT Pub. Date: Apr. 19, 2007

(65) Prior Publication Data
US 2008/0304644 A1    Dec. 11, 2008

(30) Foreign Application Priority Data
Oct. 7, 2005    (GB) .................................. 0520463.1

(51) Int. Cl.
*H04L 12/28* (2006.01)
*G06F 15/173* (2006.01)
(52) U.S. Cl. ......... 370/254; 709/223; 709/224; 709/249
(58) Field of Classification Search .................. None
See application file for complete search history.

(56) References Cited

U.S. PATENT DOCUMENTS

| | | | | |
|---|---|---|---|---|
| 6,363,424 | B1 * | 3/2002 | Douglas et al. | 709/224 |
| 6,901,440 | B1 | 5/2005 | Bimm et al. | 709/223 |
| 7,222,165 | B1 * | 5/2007 | Ellis et al. | 709/223 |
| 7,600,007 | B1 * | 10/2009 | Lewis | 709/223 |
| 7,725,570 | B1 * | 5/2010 | Lewis | 709/224 |
| 7,725,571 | B1 * | 5/2010 | Lewis | 709/224 |

(Continued)

FOREIGN PATENT DOCUMENTS

WO    96/08102    3/1996

(Continued)

OTHER PUBLICATIONS

International Search Report from PCT Application No. PCT/GB2006/003741 mailed on Mar. 14, 2007.
Examination Report from GB Application No. GB0808223.2 dated May 11, 2010.

(Continued)

*Primary Examiner* — Gregory Sefcheck
(74) *Attorney, Agent, or Firm* — Zilka-Kotab, PC

(57) ABSTRACT

A method of processing service information relating to a plurality of user services available in a telecommunications system is disclosed. The method includes storing entities defining service components in a service information database, where each service component entity represents a distinct aspect of service functionality which can be provided by the telecommunications system. Entities defining implementation technologies are also stored, each implementation technology entity being associated with a service component entity and representing a technology that can be used for implementing the aspect of service functionality represented by the service component entity. The method further stores entities defining user services available to users of the telecommunications system, each user service entity being associated with one or more service component entities defining service functionality aspects of the user service. The method can be applied to the management of service information databases or product catalogues for a range of telecommunications services and networks which provide complex services, for example Next Generation Networks (NGNs).

12 Claims, 19 Drawing Sheets

U.S. PATENT DOCUMENTS

| | | | |
|---|---|---|---|
| 7,729,286 B2 * | 6/2010 | Mishra | 370/254 |
| 2002/0169858 A1 | 11/2002 | Bellinger et al. | 709/220 |
| 2004/0088417 A1 | 5/2004 | Bober et al. | 709/227 |
| 2004/0172412 A1 | 9/2004 | Files et al. | 707/104.1 |

FOREIGN PATENT DOCUMENTS

| | | |
|---|---|---|
| WO | WO 02/06973 | 1/2002 |
| WO | WO 2004/034640 | 4/2004 |

OTHER PUBLICATIONS

GB Office Action from PCT Application No. GB0808223.2 mailed on Sep. 4, 2009.

International Search Report and Written Opinion from PCT Application No. PCT/GB2006/003741 mailed on Mar. 14, 2007.

International Preliminary Report on Patentability from PCT Application No. PCT/GB2006/003741 mailed on Apr. 9, 2008.

* cited by examiner

TELECOMMUNICATIONS SERVICE MANAGEMENT

The present application claims the priority of U.S. Pat. No. 7,729,286 filed Nov. 22, 2005, which, in turn, claims the priority of a United Kingdom patent application filed Oct. 7, 2005 under application number 0520463.1, which are incorporated herein by reference.

The present invention relates to management and/or modelling of telecommunications services, and in particular embodiments to methods and apparatus for processing service information relating to a plurality of user services available in a telecommunications system.

Modern telecommunications networks provide ever more complex services to end-users (one recent example being mobile video telephony). Correspondingly, the processes involved in provisioning such user services are also rapidly growing in complexity, and often involve complicated setup and configuration processes involving a wide range of networking technologies. From a technical perspective, user services thus represent complex sets of service characteristics, including software and hardware configuration settings and procedures.

Service providers attempt to hide this technical complexity from end-users to some extent, usually by representing specific defined combinations of service characteristics as distinct service offerings. Such service offerings are typically referred to in the art as 'telecommunications products'. Accordingly, the term 'product' will be used herein to refer to a defined combination of service features and characteristics which together specify a service available to users of a telecommunications system.

Though these 'products' do not correspond to products in a conventional sense, they can serve as useful abstractions of the underlying telecommunications functionality and its technical complexity, and can simplify the technical processes involved in provisioning services. However, to achieve this, effective telecommunications product management tools and methodologies are needed.

Existing product management systems for telecommunications services tend to rely on workflow-based approaches, where the product definition is embedded in the service provisioning process, and domain managers (DMs) are invoked directly from various points in the workflow. Though this can work reasonably well where the product-to-technology relationship is close and simple, it does mean that the characteristics of a product are hard to see and hard to maintain. This can result in many thousands of often closely related products being managed, each with attendant launch and maintenance costs, as well as confusion for the end-user and constraints on the ability of the service provider to implement rationalisations. It also often directly ties products to implementing technologies, further adding to the proliferation of very similar products that differ only in being supported by different technologies. Adding new technologies can be a complex, risky and expensive process in these circumstances.

As an example of the increase in complexity of services, telecommunications service providers are beginning to shift their focus from simple connectivity to products that add higher-level functionality to the connection, for example by delivering media content using IT platforms and hosted applications. The connectivity products themselves are also in flux, shifting from voice and data services based on conventional telephone networks to high-speed, high-bandwidth wired and wireless/mobile telephony and data services. New complex telecommunications products combining multiple telecommunications services are being devised. The need to manage migration from legacy to next-generation technologies also adds complexity to the maintenance and management of telecommunications products.

The present invention seeks to alleviate some of these problems. Accordingly, in a first aspect of the invention, there is provided a method of processing service information relating to a plurality of user services available in a telecommunications system, comprising: storing, in a service information database, entities defining service components, each service component entity representing a distinct aspect of service functionality providable by the telecommunications system; storing in the database entities defining implementation technologies, each implementation technology entity being associated with a service component entity and representing a technology usable for implementing the aspect of service functionality represented by the service component entity; and storing in the database entities defining user services available to users of the telecommunications system, each user service entity being associated with one or more service component entities defining service functionality aspects of the user service.

This can enable user services (also referred to herein as 'products' as discussed previously) to be defined independently of the technologies used to implement them. Reusable service components can be defined which represent fundamental capabilities of the telecommunications service. The service components can be considered as elementary services which can be combined to form complex services. The separation of the user service or product layer from the technology layer, and introduction of an intermediate service component layer, can have a number of additional advantages. Firstly, user services can be developed rapidly and with low risk, despite potentially increased complexity. This includes maintaining existing user services, as well as adding new ones. Secondly, it can enable user services to be delivered by a range of technologies—for example, by whatever technology meets the service level agreement (SLA) associated with the user service, thereby enabling fuller use of the deployed network assets/resources. Thirdly, new technologies can be introduced into the telecommunications service without disrupting the user service portfolio. Generally, the approach can have benefits for data quality, life-cycle management, optimisation and provisioning automation. These and other advantages are discussed in more detail below.

The telecommunications system typically provides telecommunications services. However, other types of services may additionally be provided by or using the telecommunications system, for example data processing, storage, and retrieval services. These kinds of services are also referred to herein as IT services. Specific examples of IT services could, for example, include a mailbox, web space, an interactive travel booking system or an online game.

Instead of a telecommunications system, the invention may also be applied to any suitable type of communications system or information processing system in which services are provided to end users. For example, the invention could be used to model services provided by an application server or a content delivery system.

The term "entities" preferably refers to database entities stored in the database, for example in the form of data structures. Entities may, for example, be stored in tables or groups of tables in a relational database or as objects or groups of objects in an object database. The data structures used to implement entities will depend on the type of database used. The database may be held at a single location or may be a distributed database.

The distinct aspect of service functionality represented by a service component is preferably a fundamental capability or elementary service provided by the telecommunications system. Thus, service components are preferably chosen to represent simple units of service functionality which can be usefully combined to produce complex services.

The term "implementation technologies" preferably refers to technologies available in a telecommunications system for implementing services and products. These may, for example, be networking technologies for implementing communications-related service aspects, such as ISDN (Integrated Services Digital Network) or ADSL (Asymmetric Digital Subscriber Line), or data storage or processing technologies for implementing IT service aspects, such as data files, databases, application servers or applications. Implementation technologies may comprise hardware (e.g. switches, routers, wired connections, access points, server hardware etc.), software (e.g. protocols, messaging systems, mail server applications etc.), or combinations of the two.

The term 'user service' preferably refers to a service offering, offered to users of the telecommunications system by the service provider. As already mentioned, user services are also referred to herein as telecommunications products, or simply products. A user service or product may (and often does) combine multiple individual services into a single offering, and may combine both communications and IT services. User services or products can typically be ordered, requested or purchased by the user, in response to which services matching those specified in the product are then provisioned by the telecommunications system. Provisioning of a product, service, or functionality is also referred to herein as implementation of the product, service or functionality. Technologies used in the implementation are termed "implementation technologies" as set out above, or "technology options" where multiple alternative technologies may be available to implement the same product, service or functionality. The process of implementing (provisioning) a product or user service is also referred to as fulfillment.

The telecommunications system is preferably associated with a telecommunications network, with implementation technology entities defining networking technologies usable to implement service functionality aspects in the telecommunications network (in particular communications functionality). In addition, implementation technology entities may define IT technologies usable for implementing IT service functionality, such as data storage and processing functionality and the like, provided within or externally of the telecommunications network.

The method preferably comprises associating a given service component entity with a plurality of implementation technology entities representing alternative implementation technologies, each alternative implementation technology being independently usable for implementing the aspect of service functionality represented by the given service component entity. This can allow relationships between user services and implementing technologies to be defined more flexibly.

Preferably, the method further comprises: receiving a service request relating to a user service entity; identifying one or more service component entities associated with the user service entity; and, for the or each identified service component entity, identifying an implementation technology entity associated with the identified service component entity; and implementing the service functionality aspect represented by the service component entity using the implementation technology defined by the identified implementation technology entity. In this way, user services can be implemented in an efficient and structured manner. The method may further comprise accessing one or more implementation rules associated with an identified service component entity (or a group of service component entities), and implementing the corresponding service functionality aspect (or aspects) in accordance with the implementation rule or rules. By associating implementation rules with service components, implementation of complex user services can be simplified, and new user services can be defined without necessarily having to define new provisioning procedures. Implementation rules may, for example, be in the form of instructions, procedures, scripts or the like. Accordingly, the method may comprise, for a given service component entity, accessing an implementation script associated with the identified implementation technology entity, the implementation script specifying a process for implementing the given service component using the identified implementation technology, and executing the implementation script.

The term "script" preferably refers to a set of instructions, expressed in a scripting or programming language, which are compiled or interpreted and executed to carry out the required implementation/provisioning steps. Scripts may also carry out other functions besides provisioning (for example recordkeeping and interfacing with other systems). Scripts may also be provided in a pre-compiled or byte code format, for example for execution by a virtual machine. Alternatively, directly executable machine code modules could also be used.

Where a given service component entity is associated with a plurality of alternative implementation technology entities, the method preferably comprises: selecting one of the alternative implementation technology entities in dependence on a predetermined criterion; and implementing the service functionality aspect represented by the given service component entity using the implementation technology specified by the selected implementation technology entity. This can enable different implementation technologies to be used for implementing the same service component depending on circumstances. The method may comprise assigning priority information to the alternative implementation technology entities, the predetermined criterion comprising the priority information. In this way, different technologies can be prioritised so as to enable efficient automatic selection. Alternatively or additionally, the method may comprise storing one or more rules relating to the alternative implementation technology entities, the selecting step comprising evaluating the rule or rules and selecting an implementation technology entity in dependence on the outcome of the evaluation. Rules may allow for more complex selection criteria than priority information alone.

The given service component entity may be associated with a parameter relating to the corresponding service functionality aspect; and at least one of the alternative implementation technology entities associated with the given service component entity may specify a constraint on the parameter defining a condition under which the implementation technology represented by the implementation technology entity is usable to implement the service functionality aspect. The method then preferably comprises selecting one of the alternative implementation technology entities in dependence on the constraint or constraints. This can enable automatic selection of a suitable technology based on its capabilities (as expressed by the parameter constraint).

A constraint is preferably a restriction on the set of all possible values for the parameter (e.g. a subset of the values), though in some cases, the constraint could be a null constraint (i.e. allowing all possible values or imposing no restriction).

For example, constraints specified by the alternative implementation technology entities may be (specific) values or value ranges of the parameter. However, constraints need not be absolute but could instead be relative, for example to some other parameter (possibly a parameter of a different service component). As an example, a constraint may specify that the value of one parameter must be the same as that of another parameter.

The method preferably comprises receiving a requirement constraint relating to the parameter and specifying a requirement for the service functionality which is to be implemented, the selecting step comprising comparing the requirement constraint to one or more constraints (preferably to each constraint) specified by the alternative implementation technology entities, and selecting one of the alternative implementation technology entities in dependence on the outcome of the comparison.

This can allow the automatic selection of an appropriate technology suitable for fulfilling a requirement that has been placed on the service which is to be implemented. Parameterisation, combined with automatic technology selection, can enhance the flexibility of the service information database and can simplify the definition of products and services as well as the provisioning of services.

The method preferably comprises determining whether the constraint specified by a given implementation technology entity matches the requirement constraint, and selecting the given implementation technology entity in dependence on the outcome of the determination. However, the constraints may be only one of a number of criteria (including, for example, priority information or rules as set out above) used in combination to select an implementation technology; for example, constraints may be used to identify those technologies capable of supporting a service component, and priority information or rules may then be used to further select from those capable technologies. Here, constraints may be considered to "match" if one constraint (in terms of the set of values it restricts the parameter to) contains (is a superset of), falls within (is a subset of) or overlaps (intersects) the other constraint. The exact implementation of the matching comparison may depend on requirements.

As for the constraints specified by implementation technologies, the requirement constraint may be a value or value range of the parameter, or may be any other kind of constraint. In a typical example, implementation technologies may each specify different ranges for a parameter, and the requirement constraint may specify a specific value for the parameter. An implementation technology can then be selected if the specific value of the requirement falls within its defined range (subject to other criteria that may also be considered, e.g. priority information). The requirement constraint may be specified by the service request or the user service entity to which the service request relates.

Preferably, the method comprises defining a set of parameter values that the parameter can take, the set of parameter values being selected to be independent of implementation technologies (so as to produce a technology-independent parameter). The constraint or constraints are preferably expressed in terms of the technology-independent parameter values. This can enable easier comparison between alternative technologies. The method may comprise receiving a technology-independent parameter value specifying a requirement for the service functionality aspect being implemented, and implementing the service functionality aspect may then comprise translating the technology-independent parameter value to a corresponding technology-specific parameter value in accordance with the selected implementation technology. This can enable a provisioning process to operate efficiently despite potential incompatibilities between alternative technologies.

The method may comprise identifying a network location involved in the implementation of the service functionality aspect represented by the given service component entity, receiving information relating to technology resources available at the network location, and selecting one of the alternative implementation technology entities in dependence on the received information (e.g. depending on whether resources matching an implementation technology are available at the location). This can provide further flexibility in selecting suitable implementation technologies. This and the other described selection criteria may be combined in any suitable way.

The terms "resource", "network resource", "technology resource" and the like preferably refer to any resources provided by the telecommunications system/network using which telecommunications services can be provided. Resources may include both physical network resources (for example network devices and other equipment or equipment components, such as routers, switches, cards, cables, ducts, servers, physical ports, or even larger facilities such as buildings, floors, rooms, exchanges) and logical resources (for example, software, data files, user accounts, disk space allocations and labels such as user names and telephone numbers; bandwidth allocations, logical connections, channels, time slots, or logical ports).

Preferably, implementing the service functionality aspect comprises identifying one or more technology resources in a communications network associated with the communications service which correspond to the implementation technology specified by the identified or selected implementation technology entity, and implementing the service functionality aspect using the identified resource or resources. The method may further comprise sending activation or configuration information or instructions to the resource or resources to configure the resource or resources to provide the service functionality aspect. For example, configuration instructions may be transmitted over the network to a network device such as a router to configure the device for the service.

Preferably, the method further comprises storing an entity defining a family of related user services and specifying a set of service component entities usable for defining user services in the service family, and wherein the service family entity is associated with one or more user service entities representing user services of the service family, each such user service entity being associated with all or a subset of the set of service component entities specified by the service family entity. This can enable better organisation of the service information database, and can simplify definition and implementation of user services. The service family entity may further specify one or more of: a constraint on a parameter associated with one of the specified service component entities, a dependency between specified service component entities or between parameters of specified service component entities, and an indication of whether a given specified service component entity represents an optional or non-optional service component of user services in the service family. This can provide increased flexibility.

The method may further comprise organising service component entities in a hierarchy by defining associations between service component entities. The method may comprise associating a service component entity representing an aspect of service functionality with a plurality of subsidiary service component entities representing constituent elements of that aspect of service functionality. This can again enhance flexibility and simplify provisioning. Provisioning (implementation) of a high-level service component in such a hierarchy is preferably performed by provisioning (implementing) each of its sub-components, typically in a specified or automatically determined order. The order may be selected based on efficiency considerations or interdependencies between sub-components.

The stored service component entities preferably include one or more of: access connection components defining service functionality for accessing a network; network connection components defining service functionality for providing connectivity or capacity within a network; content delivery components defining functionality for data storage, processing and/or transmission; authentication components defining service functionality for user authentication, authorisation and/or conditional access; and public label components defining service functionality for identification or labelling of users and/or for providing access to users. Each service component may be associated with one of the above component types. By using these component types, products and services can be more efficiently modelled.

Preferably, the method comprises managing migration from a first technology represented by a first implementation technology entity to a second technology represented by a second implementation technology entity by: identifying a service component entity associated with the first implementation technology entity; and associating the identified service component entity with the second implementation technology entity. Preferably this is carried out for each service component entity associated with the first implementation technology entity. In this way, technology migration can be managed more easily. Implementation technology entities are preferably associated with priority information, the method preferably further comprising assigning a higher priority to the second implementation technology entity than the first implementation technology entity. This can force future provisioning to select the second implementation technology when possible, thus assisting in the phasing out of the first implementation technology. Alternatively, a lower priority could be assigned to the second implementation technology, for example if it is desired to 'use up' existing technology resources before new ones are provisioned. Preferably, the method further comprises disassociating the first implementation technology entity from the identified service component entity and/or deleting the first implementation technology entity. This can prevent the first implementation technology being used in the future.

The method may further comprise: receiving a request specifying an implementation technology; and outputting a report specifying user services represented in the service information database which can be implemented using the implementation technology. This may comprise: identifying an implementation technology entity representing the specified implementation technology; identifying a service component entity associated with the identified implementation technology entity; identifying user service entities associated with the identified service component entity; and outputting the report on the basis of the identified user service entities. This can enable valuable information to be extracted from the database relating to the dependence of user services on given technology. Conversely, the method may also or alternatively include outputting a report identifying the implementation technologies used or usable in implementing a given user service or services.

In a further aspect of the invention, there is provided a method of provisioning services in a telecommunications network, comprising: receiving a service request specifying one of a plurality of user services providable to users of the telecommunications network; accessing service data corresponding to the specified user service in a service information database, the service data specifying a plurality of service aspects of the specified user service; for a given one of the specified service aspects, retrieving implementation data associated with the service aspect and specifying a plurality of implementation technologies usable for implementing the service aspect from the database; selecting one of the implementation technologies specified by the implementation data; and implementing the aspect of the specified user service in the network using the selected implementation technology. The method may further include any of the features of the method aspect set out above, in any appropriate combination.

In a further aspect of the invention, there is provided a method of provisioning services in telecommunications system, comprising: storing, in a service information database, entities defining service components, each service component entity representing a distinct aspect of service functionality providable by the telecommunications system; associating provisioning information with service component entities (preferably with each service component entity); storing in the database entities defining user services available to users of the telecommunications system, each user service entity being associated with one or more service component entities defining service functionality aspects of the user service; receiving a service request relating to a given user service entity; identifying one or more service component entities associated with the given user service entity; and for each identified service component entity, retrieving provisioning information associated with the service component entity and provisioning the service functionality aspect defined by the service component entity in accordance with the retrieved provisioning information.

In a further aspect of the invention, there is provided an electronic service information database for a telecommunications system comprising: entities defining service components, each service component entity representing a distinct aspect of service functionality providable by the telecommunications system; entities defining implementation technologies, each implementation technology entity being associated with a service component entity and representing a technology usable for implementing the aspect of service functionality represented by the service component entity; and entities defining user services available to users of the telecommunications system, each user service entity being associated with one or more service component entities defining service functionality aspects of the user service. The database may comprise any of the features set out in the context of the method aspects described above, in any appropriate combination.

The invention also provides a computer program or computer program product for processing service information relating to a plurality of user services available in a telecommunications system, comprising software code adapted, when executed on a data processing apparatus, to perform a method as described herein; and apparatus for processing service information relating to a plurality of user services available in a telecommunications system, comprising means for performing a method as described herein.

The invention also provides a service provisioning system comprising: an electronic service information database as described herein, and a provisioning component adapted to provision user services in accordance with the service definitions in the database. The service provisioning system is preferably adapted to: receive a service request relating to a user service entity; identify one or more service component entities associated with the user service entity; and provision each identified service component. In this way, a structured, efficient provisioning system can be provided. A given service component entity may be associated with one or more constituent or subsidiary service component entities, the provisioning system being adapted to provision the given service component by a process which includes provisioning each subsidiary service component. The system is preferably further adapted to provision a given and preferably each service component by reference to a set of provisioning instructions (for example in the form of a script) defined for the service component. The provisioning instructions may specify the provisioning of one or more additional service components, the provisioning system being adapted to provision the additional service component(s). In this way, the database may specify for a user service only those service components relevant to the user experience of the service, with the provisioning process adding further service components to complete the service. The provisioning instructions preferably specify provisioning steps for connecting several provisioned service components, in particular for connecting constituent or subsidiary service components and/or any service components added to the service during provisioning. The service provisioning system is preferably further adapted to perform a method as set out above.

In a further aspect, the invention provides a service provisioning system for a telecommunications network comprising: a service information database defining: a plurality of service components, each service component representing functionality that can be provided by network resources in the telecommunications network, and a plurality of user services, each user service representing a service which can be provided to users of the telecommunications network and being associated in the database with one or more of the plurality of service components, the one or more associated service components specifying the service functionality of the user service; the system further comprising: an order interface adapted to receive a service order relating to a given user service; a plurality of domain managers for managing technology resources of respective network technology domains; and a provisioning component adapted to access the service information database; identify one or more service components associated with the given user service; and, for each identified service component, select an implementation technology usable for providing the service functionality represented by the service component and issue a command to the domain manager associated with the selected implementation technology to configure one or more network resources to provide the service functionality.

In this way, an efficient and flexible provisioning system can be provided, in which provisioning details, in particular technology selection, can be decoupled from the definition of the user services being provisioned.

The service information database preferably further defines one or more implementation technologies associated with each service component, the provisioning component being adapted to select an implementation technology for a given service component from the implementation technologies defined for the service component in the database.

Preferably, the provisioning component is adapted to select an implementation technology in dependence on network resources available at a serving location at which the service is to be provided. Alternatively or additionally, the provisioning component may be adapted to select an implementation technology in dependence on priority information defined for available implementation technologies. The service order may specify one or more requirements for the service, in which case the provisioning component may be adapted to select the implementation technology in dependence on the ability of available implementation technologies to fulfil the specified service requirements. In selecting implementation technologies, the provisioning component preferably seeks to make use of available capacity already delivered to the user (as long as it meets the requirements specified in the order and/or the requirements of the service), for example by preferentially selecting an implementation technology already provisioned to the user (for example in connection with another service). These features can provide greater flexibility in selecting appropriate implementation technologies at the time of provisioning, instead of requiring the implementation technologies for user services to be predefined, and can enable more effective utilisation of network resources.

The provisioning component is preferably adapted, for each identified service component, to retrieve provisioning information, the provisioning information specifying a process for configuring one or more network resources of the selected implementation technology to provide the functionality represented by the service component, the provisioning component being adapted to provision the service component in accordance with the provisioning information. The provisioning information may comprise a script, in which case the provisioning component is preferably adapted to execute the script. In this way, provisioning behaviour of the system can be managed effectively; in particular, provisioning processes can be defined and changed more easily. The provisioning information may be stored in the service information database and be associated in the database with the implementation technology and/or service component to which it relates.

The provisioning component is preferably adapted to coordinate the provisioning of different service components in the respective technology domains of the selected implementation technologies. As an example of this, the provisioning component is preferably adapted to perform additional configuration to connect network resources of different technology domains or otherwise enable any required interaction between network resources of different technology domains. In this way, aspects of a service which cannot be configured by the domain managers can be implemented, to thereby complete the provisioning of the service.

Preferably, the service provisioning system further comprises a service inventory database comprising data defining provisioned services and/or services being provisioned, the provisioning component being adapted to modify the service inventory database in response to the provisioning of the service order. This can allow a record to be created of provisioning activities and provisioned services, which can assist in identifying problems which occur during provisioning and can also enable partially provisioned services to be removed (e.g. due to an error or if the order is cancelled during the provisioning of the service). The database can also provide an inventory of live services, which can support day-to-day operation of services, service upgrades or cancellations, as well as reporting functions and the like.

The provisioning component is preferably adapted to create a service instance entity in the service inventory representing the instance of the user service being provisioned, and is preferably adapted to create a resource instance entity in the service inventory for each service component being provisioned, each resource instance entity representing the network resources of the selected implementation technology being used to provision the service component. In this way, the service inventory matches the structure of the user service and service component definitions in the service information database, which can simplify subsequent processing and analysis.

The invention also provides a computer program and a computer program product for carrying out any of the methods described herein and/or for embodying any of the apparatus features described herein, and a computer readable medium having stored thereon a program for carrying out any of the methods described herein and/or for embodying any of the apparatus features described herein.

The invention also provides a signal embodying a computer program for carrying out any of the methods described herein and/or for embodying any of the apparatus features described herein, a method of transmitting such a signal, and a computer product having an operating system which supports a computer program for carrying out any of the methods described herein and/or for embodying any of the apparatus features described herein.

The invention extends to methods and/or apparatus substantially as herein described with reference to the accompanying drawings.

Any feature in one aspect of the invention may be applied to other aspects of the invention, in any appropriate combination. In particular, method aspects may be applied to apparatus aspects, and vice versa.

Furthermore, features implemented in hardware may generally be implemented in software, and vice versa. Any reference to software and hardware features herein should be construed accordingly.

Preferred features of the present invention will now be described, purely by way of example, with reference to the accompanying drawings, in which:—

OVERVIEW

The product modelling approach described herein seeks to remove the direct dependency between the telecommunications products provided by a telecommunications service and the technologies used to implement them. The model described therefore models products and implementation technologies as separate layers, loosely coupling them by way of an intermediate layer, and allowing each layer to be managed and optimised independently. Loose coupling between the layers also adds flexibility in the way technology can be used to support the product portfolio.

The decoupling is based on an understanding of the fundamental capabilities that the telecommunications service provides. These fundamental capabilities are captured as 'Service Components' in the intermediate layer of the model.

An advantage of this layered approach is that it can enable products to be expressed in terms of end-user requirements rather than specific implementation technologies. This shift in focus can also enable deployment and investment strategy to be based around capability delivered to the end-user, and to be less driven by technology requirements. The product modelling approach described can also simplify product life-cycle management and service fulfillment processes.

The product modelling approach will now be described in more detail with reference to FIGS. 1 to 5.

Figure 1:
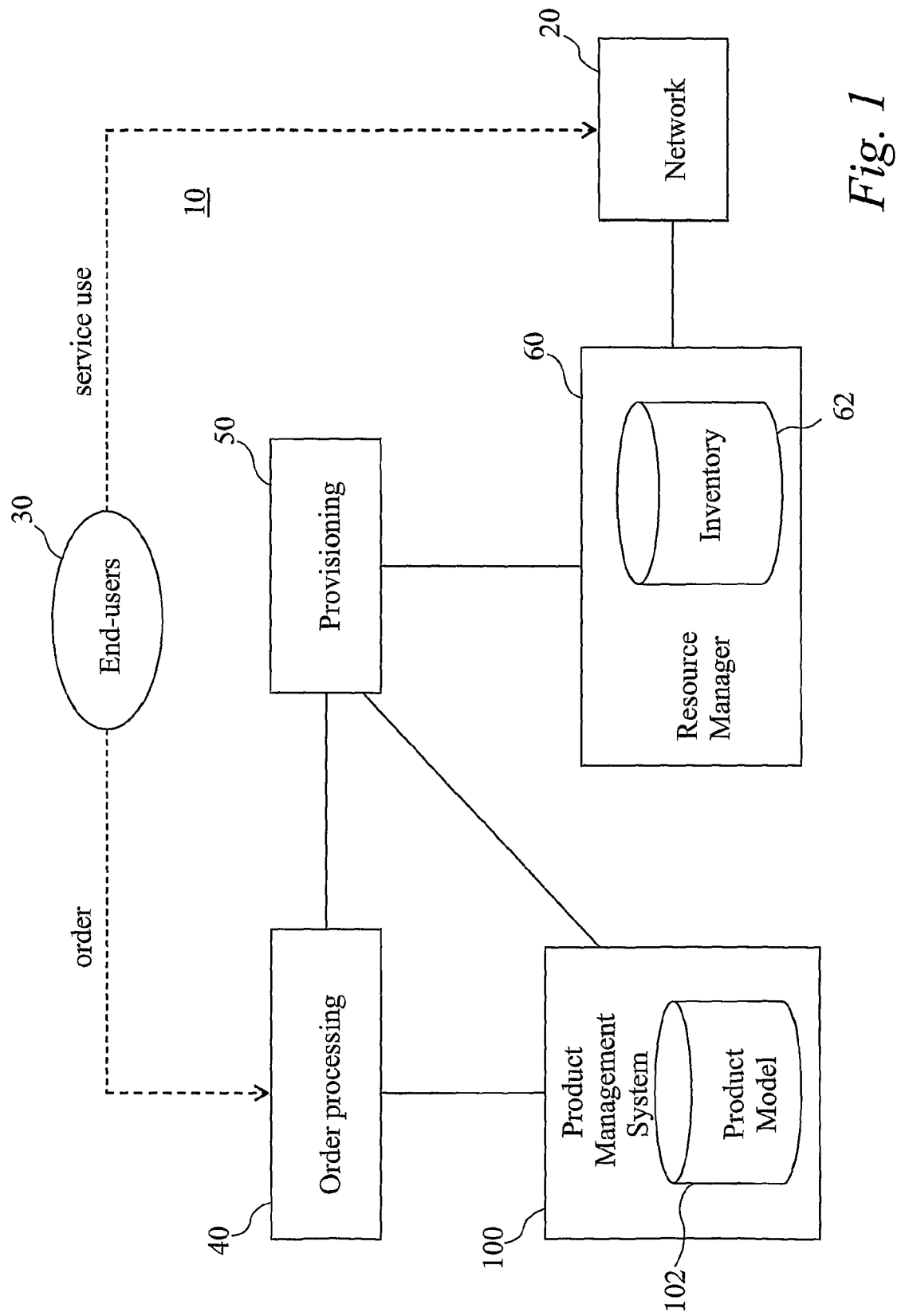
FIG. 1 shows an overview of components of a telecommunications service, including a product management system.

FIG. 1 shows a simplified overview of a telecommunications service 10.

Telecommunications service 10 includes a telecommunications network 20 for providing telecommunications services (such as telephony, internet access etc.) to end-users 30. The services provided by the telecommunications service 10 and used by end-users 30 are defined in terms of a set of telecommunications products, which are managed by a product management system 100. Product management system 100 maintains a product model 102 representing available products and technologies used in their implementation as is described in more detail below.

A user can request products by way of product orders using an order processing system 40. The order processing system 40 interacts with the product management system 100 to obtain information relating to an ordered product. The order processing system comprises an order entry process for receiving orders from end-users (for example directly by way of a web interface or through an intermediary such as a salesperson operating an order entry application at a call-centre); and an order fulfillment process for fulfilling a product order by enabling the relevant services in the network 20.

To achieve the latter, order processing system 40 interacts with a provisioning system 50. Provisioning system 50 is responsible for provisioning (that is, delivering) services corresponding to ordered products by retrieving information identifying implementation technologies for use in provisioning the required services from product model 102 and identifying and configuring existing network resources and/or initiating the creation of new network resources in network 20 to support the required services. Changes to network resources, and addition of resources to the network are managed by resource manager 60, which maintains an inventory 62 of the resources available in the network 20.

Once services corresponding to an ordered product have been provisioned and any necessary changes/configuration of the network has been completed, an end-user 30 can then use the services defined by the ordered product in network 20. Products may also include services which are not provided, or not provided wholly, by network 20, in which case the order fulfillment and provisioning processes may interact with other systems to deliver those services as required.

The resource manager 60 and the inventory 62 are also used by other functions within the telecommunications service which are not discussed in detail here and which are not shown in FIG. 1. Examples include network planning and design functions and reporting functions.

Figure 2:
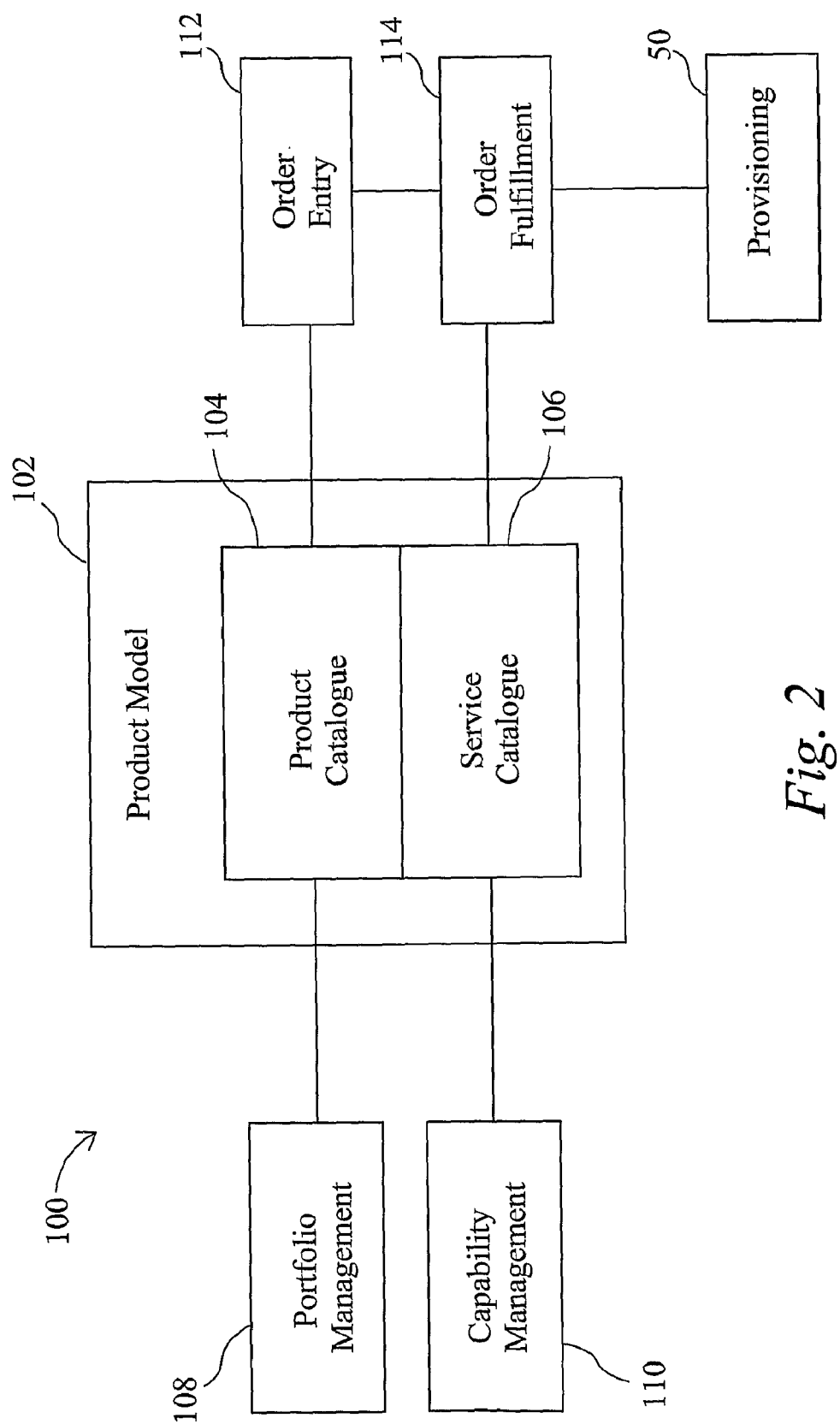
FIG. 2 illustrates the product management system in more detail.

FIG. 2 illustrates the product management system 100 in more detail.

Product management system 100 comprises a product model 102 for modelling the products available to end-users.

The product model 102 is made up of two parts: a product catalogue 104 and a service catalogue 106. The product catalogue 104 stores information defining the products which are available to users. The service catalogue 106 stores information defining elementary services that can be provided by the communications network, and the technologies available to implement those elementary services in the network (referred to herein as implementation technologies). Elementary services are distinct aspects of service functionality and represent fundamental capabilities of the communications network. Additionally, the telecommunications service may provide other services which do not use the communications network (or do not use it directly), and these may also be represented as elementary services in the service catalogue, but no implementation technologies are usually defined for such services.

The product model 102 thus distinguishes between the elementary services the network can provide, and the products that are made available to the end user. A portfolio management process 108 allows for addition, modification and deletion of products to and from the product catalogue 104. The portfolio management process may, for example, involve use of an interactive portfolio management application by a human portfolio manager.

A capability management process 110 operates on the service catalogue 106 and allows the elementary services to be specified and the implementation technologies for those elementary services to be defined. This may again be achieved by way of an interactive capability management application.

Definition of the products available to users, and of the technology used to implement those products, is thus separated. The nature of the interaction between these two aspects of the product model 102 is described in greater detail below.

An order entry process 112 receives end-user orders relating to products defined in the product catalogue 104, for example from an interactive order entry application. An order fulfillment process 114 manages the fulfillment of product orders using service provisioning process 50. The provisioning process 50 is responsible for the provisioning of services in the network 20 using information defining elementary services and implementation technologies obtained from service catalogue 106.

Figure 3:
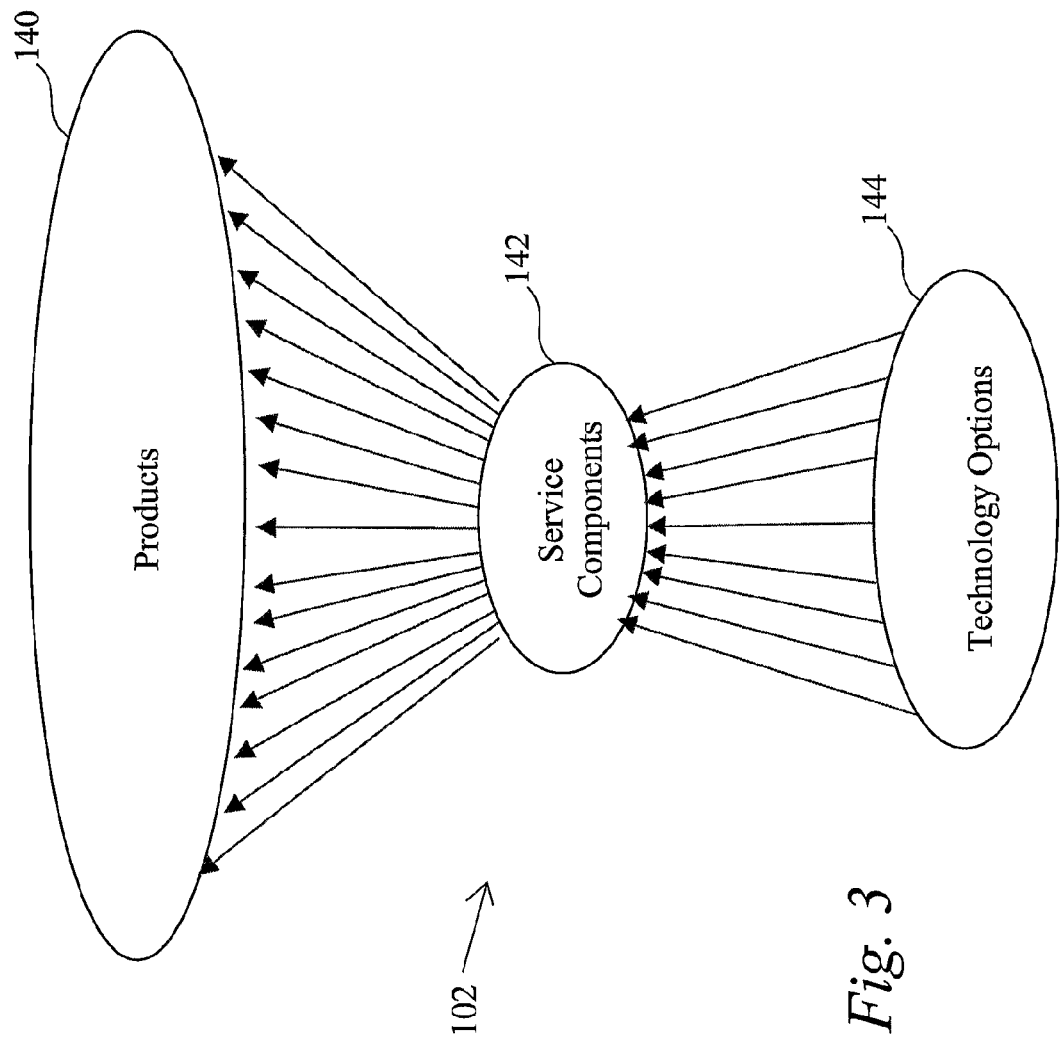
FIG. 3 illustrates a product model used by the product management system.

FIG. 3 illustrates the product model 102 in more detail.

A first layer 140 of the product model 102 stores entities defining Products available to end-users of the telecommunications service. These Products represent complex services and may be grouped into Product Families.

A second layer 142 of the product model stores entities defining the elementary services provided by the network. A Product consists of one or (usually) more such elementary services. Elementary services are thus building blocks or components from which more complex services can be constructed. For this reason, the elementary services will be referred to herein as Service Components.

A third layer 144 stores entities defining implementation technologies. Implementation technologies are technologies usable in implementing given Service Components. As there will often be several alternative technologies available for the implementation of given service components, implementation technologies will also be referred to herein as Technology Options.

The product layer 140 corresponds to the product catalogue 104 of FIG. 2. The Service Component layer 142 and Technology Option layer 144 together correspond to the Service Catalogue 106 of FIG. 2.

The product model defines associations between Products in the product layer 140 and the Service Components from which those products are made up in the service component layer 142, with a given Product consisting of one or more Service Components as already mentioned. The model further defines associations between Service Components in the service component layer 142 and Technology Options in the technology options layer 144. A given Service Component may be associated with one or more Technology Options. When several Technology Options are defined for a given service component, these represent alternative technologies which can be used for implementation of the Service Component.

There are typically a relatively small number of Service Components (say, in the tens), from which a potentially large and frequently changing range of Products (e.g. in the thousands or more) can be constructed. The Service Components, once defined, will typically change only rarely. The available Technology Options will typically change more frequently (and be greater in number, say, in the 100s) than the Service Components, but less frequently than the Products they ultimately implement.

The different layers of the product model will now be described in more detail.

Service Components

Service Components specify the communications capability that is delivered to the end user in terms of content, quality and quantity—the capability that the end user recognises and is willing to pay for.

Service Components model the fundamental capabilities a telecommunications service provides to end-users. This approach to modelling can help focus the service provider on optimising these fundamental capabilities, both for the market, in terms of providing new telecommunications products, and by reducing the cost of delivering telecommunications services.

As indicated above, Service Components are typically relatively stable, evolving much more slowly than either Products or Technology Options. This is because it is typically rare for a fundamental new capability to be added to the telecommunications service. However, in recent times, Next-Generation-Networks (NGNs) delivering applications, such as VoIP and IPTV, over data networks, have established IT Applications as a new capability that needs to be managed within telecommunications services. The result can be a significant increase in the number of combinations of components that are now possible, adding complexity to the product management process.

The service component layer in the product model decouples the product definition from the hardware implementation. This decoupling can enable the telecommunications service to exploit any suitable technology (represented by Technology Options) that may be available to deliver a given product order. By having a larger range of implementation options, the time required to provision or repair a service can be shortened. It can also result in an increase in the overall utilisation of technology resources. For example, where specialist TDM (Time Division Multiplex) capacity has been exhausted, it is possible to use xDSL technology to deliver n×64 kbit/s leased line products. This is possible because the product definition need not limit the implementation of the product specifically to TDM.

Decoupling of implementation technologies from the definition of products can also simplify migration to new technologies. New technologies can be deployed according to any rollout plan. The order fulfillment process can exploit whatever technology, new or legacy, that may be present at any particular location. Rules can be used to govern selection where there is a choice of technologies and all of this can be transparent to the rollout programme.

A good contemporary example is the voice service, which is transitioning from the public switched telephone network (PSTN) to fully digital data networks. The fundamental voice service remains largely the same; it is only the delivery technology that is being transformed. The transformation is typically carried out by the service provider to reduce both operational and capital costs and to establish a platform for next-generation products. Both technologies will nevertheless often need to be managed together, seamlessly, and for residential volumes, for a number of years. The product model described can assist in the transition by allowing the voice service to be defined independently of the technology it is delivered over, with the fulfillment process able to make use of either technology depending on circumstances.

Service Components are usually not used on their own (though in some examples, a very simple telecommunications Product could conceivably consist of only a single Service Component). Typically, Service Components are combined in order to provide a useful capability to the end-user. However, each Service Component will result in a domain-specific service from particular network resources, such as a broadband access network or HLR (Home Location Register). In this way, combinations of Service Components can be used to define complex end-user products that make use of a number of different types of network resources.

As mentioned above, in addition to Service Components which represent functionality provided by network resources, other, non-network services may also be modelled as Service Components. Such services may be managed by a service management layer (SML) in the telecommunications service. SML services are here considered separate from network resource based services and are modelled as separate types of Service Components, effectively resulting in separate SML and resource service component layers. This can allow the fulfillment process to proceed in both layers with a high degree of independence.

Principles for Defining Service Components

Products, and their associated Service Components are not themselves descriptions of network resources, but instead specify requirements that the network resources needs to satisfy. The service components thus typically do not define all the elements of the network that make up a service, but instead only describe service features directly experienced by the end-user.

Aspects that the end-user does not directly experience, such as technology choice and any intermediate capability; core network, server platforms and so on, are determined by provisioning automation when the service is delivered.

The definition of a suitable set of service components is led by the following goals:

To enable rapid construction and maintenance of Products
Encapsulation of a range of technologies that provide essentially the same capability
The ability to combine Service Components in order to specify a complex service The first of the above points means that the Service Components should preferably be reusable and have provisioning behaviour that is well understood.

The second point implies that there should preferably be a small number of Service Components, each of which may be implemented using a wide range of technologies The third point reinforces the second. There should preferably be only one structure for each distinct capability, so that different instances of that capability can be directly compared and combined. The system preferably provides for parameterisation within the structure, to allow the capabilities to be compared on a parameter scale.

Another implication is that each Service Component should preferably be 'orthogonal' to the others. That is, it should be possible to vary the quality and quantity of a component without impacting any other component in the product: there should preferably be no necessary, or inevitable dependencies between Service Components (though a Product may specify dependencies between its components, as part of its definition).

It is generally preferable not to use a large number of different types of Service Components, defined narrowly, up to the point that they can only be supported by one technology. Such an approach could lead to definition of services that do not capture the essential capability in a way that could make sense to an end-user. It can also undermine the ability to combine components to provide services that reuse underlying resources.

The aim is thus to identify a small set of component types that are sufficient to describe a full range of ICT (information and communication technology) products, are generic, do not overlap and are configurable. The components are preferably designed to support capabilities to the end-user as well as those used by the telecommunications service to create internal services.

It is further preferable to distinguish between content, which is generated/consumed by users of the telecommunications service, and the capacity created by the telecommunications service (in the form of network resources) to transport the content. Both can form the basis of services and products and should preferably be modelled.

The network resources themselves usually do not generate content, but are responsible for its delivery. For example, live delivery is used for:

Real-time multi-media conversations between end-users
Broadcast services
End-user interaction with hosted applications
Storage and retrieval delivery is used for:
Messenger services
Media-on-demand services
Identity management, which is associated with the end-user, and also determines how other users have access to the end-user Identifying the correct scope and boundaries for each component can help to improve reusability of Service Components.

SLA Metrics and Service Component Parameterisation

One potentially effective representation for Service Components follows the approach taken by Service Level Agreement (SLA) management. Here, a service is defined by a set of parameters, or metrics, and an SLA is defined by the agreed limits for those parameters. The Service Level Guarantee (SLG) typically sets limits beyond which the SLA is considered to be violated (and penalty payments are due, for example). This gives a clear motivation to manage the agreed metrics.

If this is the way service features are agreed with an end-user (and subsequent service assurance is performed), the same parameterisation is preferably used to define the Products and Service Components. Each type of Service Component preferably represents a distinct and fundamental capability (referred to as a distinct aspect of service functionality, or an elementary service, above), but the capability is further specified by a set of parameters that typically specify quantity and quality of the offering. This allows a small set of Service Components to be used to describe a wide variety of capabilities and allows these to be varied by changing the parameter values. It also helps to more precisely define what the telecommunications service is offering to end-users, independently of how services are actually implemented.

These parameters also provide a link between the description of products in end-user terms, and the specific information required for technical implementation. However, Service Components are explicitly not dependant on the complexity, diversity and specialisation found in the technology layer. As such, they can help to hide the complexity of the underlying technology from the telecommunications service, in effect converting technology resources into a commodity that can be optimised separately from other aspects of the telecommunications service.

Five Categories of ICT Service Component

The considerations above can be used to derive a set of categories of Service Components for use in a given setting. By way of example, the following set of five categories of Service Components may be chosen for use in defining media-rich telecommunications services, but other categorisations may be used depending on exact requirements and circumstances:

Access Connection—a connection into a network—delivers content in and out of the network Network Connection—a connection (typically between two points) within a network—can be used in two ways; for creating capacity and for transporting content Content Delivery—data storage and data processing functions used to store content and deliver content in and out of applications Authentication—authorises the end-user to use services Public Label—controls the access other users have to the end-user These fundamental categories have a rich parameter set, which allows the definition of a wide range of ICT products by various combinations of these components. Components are here broadly classified into those relating to network connections (i.e. components relating directly to network resources) and those relating to higher-level, often software-driven services of the network such as data processing and storage, referred to herein as IT service components (or simply IT components). In the above list, the first two are typically connection components; while the last three may often be IT components (though in some circumstances such aspects could also be part of the connection functionality and not be supplied as separate IT services in the above sense; e.g. a telephone number in a PSTN which in essence fulfils a Public Label function).

Service Component Prototypes

The basic categorisation is a compact way of representing Service Components; a small number of categories, each covering a wide range of capability through a number of parameters. This is useful as it allows direct comparison between and combination of different Service Components, but it does not easily convey the purpose of a component within a product. In a preferred embodiment, the basic categories are therefore expanded into a fuller set of Service Components which are specialisations of the generic categories, designed to represent specific types of function. These specialised Service Components are referred to herein as service component prototypes.

Taking the Access Connection category defined above as an example, the following are examples of service component prototypes, defined by constraints on their parameters. Only a few parameters (e.g. type of data, bandwidth, variable/constant/unspecified bit rate—VBR/CBR/UBR) are presented for illustration:

Control channel/Text, <6 kbit/s, UBR

High quality narrowband data, 2 k-512 kbit/s, CBR

Voice quality audio, 20 kbit/s VBR (rt—real-time)

Standard Data/Video telephony, 220 kbit/s VBR (nrt—non real-time)

Broadcast quality audio, 220 kbit/s VBR (rt) (Composition quality may require higher bandwidth)

Broadcast quality video, ~4 Mbit/s VBR (rt) (Composition quality may require higher bandwidth)

High bandwidth, high quality data, 2 to 155 Mbit/s, CBR, synchronous.

Similar specialist capabilities can be defined for the other Service Component categories; by way of example:

Network Connection prototype—TDM bearer section; 155 Mbit/s to 10 Gbit/s synchronous CBR, Content Delivery prototype—Exchange Server; 128 kbit/s, UBR Content Delivery prototype—VoIP Manager; 20 kbit/s VBR (rt)

Authentication prototype—Secure

Public Label prototype—name alias, Private

Some other possible service component prototypes for the Authentication and Label categories are discussed further below.

The above list of service component prototypes is merely exemplary. The actual service components used will depend on specific requirements.

In the above example, Service Components in the Content Delivery category have parameters that specify the type of connection required to support the content.

Service component prototypes preferably hold information that allows prototypes of the same category to be directly compared. This can provide improved flexibility in combining Service Components relating to multiple products ordered by the same user so as to provide merged services, as is discussed in more detail in relation to the use case described below. Connection components can be compared relatively easily using numeric parameters such as bandwidth, but non-numeric parameters, like Class-of-Service (CoS), may need explicit comparator relationships (<, =, > and so on) to be defined. In some cases (for example, IT components) explicit comparator relationships between all of the prototypes of a category may need to be defined.

The relationships are preferably created as part the service component prototype definition. An example of such a relationship is: "videophone session management contains voice telephony session management". This example is discussed further in relation to an exemplary use case below.

Service Components also represent a fundamental unit of service for the purposes of a separate provisioning process (e.g. provisioning process 50 in FIG. 1). To this end, provisioning rules are preferably associated with Service Components (though these may not be part of the model itself but may be stored elsewhere).

As mentioned briefly above, two types of Service Component can be distinguished: those that encapsulate resource utilisation (e.g. connection components and IT components as described above), and non-network end-user-facing aspects of a service. These may, for example, include billing, customer care and response times. These aspects are referred to herein as Service Management Layer (SML) functions and may also be modelled as Service Components (to distinguish from the network resource related Service Components, these are referred to herein as SML components).

Another major function of the SML components is to provide non-network user equipment (CPE—Customer Premises Equipment) and client software for CPEs. Such items are often not managed by the telecommunications service provider and may not consume capacity in network resources. As such they are better suited for management in the SML, provisioned, for example, by workflow-based processes in order management systems. They can be inventoried in a network resource model (such as inventory 62 of FIG. 1), or in pure asset management systems. However, the product model is preferably used to drive both the deployment/provisioning of SML service components and of network-resource based Service Components (also referred to simply as Resource Service Components). Since only the Resource Service Components are related to network technologies, only those components are associated in the product model with implementation technologies (in the form of Technology Options).

In contrast to the SML, the Resource Management Layer (RML) consists of the systems and processes used to manage ICT resources (in particular network resources). This typically includes network design/engineering systems, assurance systems, and resource provisioning systems. In a preferred embodiment, resource provisioning is provided in two parts: Domain Managers (DMs) manage the detailed provisioning of services in specific network resources they are responsible for; and Inter Domain Provisioning (IDP) designs and assigns services among DMs. The two combine to enable flexible provisioning of the relevant resources.

The product model can support the provisioning process in all three of these layers: SML, IDP and DM. It can transform provisioning into a data driven function, with control explicit in the model, rather than buried in workflow. Existing workflow based solutions can be highly complex, hard to change and costly to maintain.

Provisioning is discussed in more detail below.

Technology Options

Technologies deployed in the network (and which are potential implementation technologies for new services) are represented as Technology Options in the service catalogue part 106 of the product model 102. Technology Options are preferably defined in terms of the quantity and quality of service the individual technologies are able to provide in implementing Service Components.

Each Technology Option will typically support a single Service Component, providing a range of capability to that component. The Technology Option is represented with similar parameterisation to the corresponding Service Component, but rather than stating a requirement, the parameterisation of a Technology Option describes the range of capability the technology in question can supply. Expressing capability in this way means that the Technology Option is defined in terms of what it offers to the end-user, which can enable like-for-like comparison across different technologies.

This also means that potential technologies can be directly compared to the service requirements specified by a Product and/or a product order, so simplifying the high-level provisioning process. Where there is a requirement for new network resources to satisfy a product order, the Service Catalogue can be used to select the best delivery technology by direct comparison of the product order to the available Technology Options. The provisioning process is discussed in greater detail below.

How implementation technologies are represented as Technology Options in the model will depend on the service provider's need to distinguish between different implementation technologies and prioritise one technology over another. As such the definition of Technology Options can be broad or can take into account specific factors, such as the physical bearer (copper, fibre or radio) and the type of network termination equipment/NTE (2 port, 4 port, multi-technology and so on). For example, in MSANs (Multi-Service Access Networks), the edge device technology is capable of delivering several connection technologies (PSTN, ATM, Ethernet, TDM and so on) over more than one physical bearer and possibly with different NTE options. Each one of the resulting combinations could be considered a different Technology Option, depending on the service provider's requirements.

More than one technology may be capable of meeting the requirements for a given Service Component. To address this, each Technology Option also has an associated priority, or ranking. These priorities are used to select one of the available Technology Options. Priorities may be based on a number of factors, such as the cost to purchase, deploy and operate the technology and whether the technology is being withdrawn. Ranking technologies in this way can prevent expensive technologies being used for low value products and can reduce the use of obsolete technologies.

Continuing from the previous example, some examples of Technology Options (with associated Service Components) are:

Access Connection—ADSL; <8 Mbit/s, UBR to CBR
Network Connection—SDH; 2 Mbit to 10 Gbit/s, CBR (synchronous)
Content Delivery—'PictureEdit'; picture editing application, 2 Mbit/s, UBR
Authentication—Secure; Server login, Username, password, biometric reading
Public Label—Private; PSTN, number
Public Label—Public; Web server, URL
Products Products are created by the telecommunications service provider to meet and create end-user demand. Some telecommunications service providers target a wide range of market sectors, which can lead to many thousands of individual Products being offered, many of which will be little more than marketing variants, with specialist packages and variations in billing, SLA (service level agreement) and QoS (quality of service).

The product model described here can enable Products to be defined not by technology, but by fundamental capabilities, as captured in the Service Components. Products can thus be defined in terms of end-user requirements, expressed in a form which is relevant to the end-user—such as the desire to watch a video, leave a voice message or be fed information. This allows the telecommunications service to be closer to the end-user and more capable of exploiting the changing market place. The service provider can focus marketing activities on selling lifestyle, anticipating the desires of the end-user, and offering the kinds of interactivity that end-users are willing to pay for, rather than offering services dictated by available technology. By using the present product modelling approach, available technologies can be viewed as delivery vehicles for services, and focus is shifted from technology to end-user requirements.

Marketing of broadband services is a good example, where terms such as 'Digital Subscriber Line' typically mean little to the end-user. It is preferable to describe the products in terms of end-user experience; e.g. the ability to access media-rich information, without losing the phone or worrying about the bill. Describing products in this technology-neutral way can also enable the service provider to deliver products by a range of alternative technologies. How a network service is delivered, e.g. whether by cable, copper or fibre, ATM, Ethernet, MSANs or DSLAMs, is then an issue for the service provider, and need not concern the end-user.

By using reusable Service Components, whose operational behaviour and costs are known, the present product modelling approach can allow the definition of Products to be changed rapidly, cheaply and with a high confidence that they can be operated cost effectively. This added flexibility can allow the service provider to converge on products that better fit the requirements of the end-users.

Referring back to FIG. 2, the portfolio management process 108 generates a set of Products that specify product features for the end-user, as well as the requirements the Products place on network resources. When an end-user orders a Product, the order entry process 112 completes the specification of these requirements, so that the provisioning process 50 is given a precise definition of what it needs to provide. Provisioning is discussed in more detail below.

Products preferably determine both the provisioning of network resources and the management of the Service Level Agreements (SLA), using the product data to drive both functions. When combined with volume forecasts, the product data can also be used to plan resource deployment.

End-User Capabilities

Service Components typically need to be combined to produce useful capabilities for the end-user. This is typically true for connection components that usually specify at least two ends. For example:

Two Access Connection components will produce a leased line

An Access Connection component and a Content Delivery component will produce an ASP (Application Service Provider) capability (Internet Access being a simple example)

IT components can often provide useful capability to the end-user on their own. This is the case where a connection does not need to be specified in the product, typically because the service can be accessed through the Internet or through another carrier.

Note that the product usually only specifies those components that directly affect the end-user experience. Intermediate components may be required to construct a complete service, but the provisioning process is free to define such components, usually with the goal of producing the least-cost service that satisfies the SLA. This solution can give more flexibility to the service provisioning process; choosing the technology, media and intermediate locations, while delivering agreed end-user experience and the SLA.

Service Components specified by the provisioning process are otherwise the same as those explicit in the product definition. One example of a type of service component that may be used as an intermediate component is the Network Connection component. For example, leased-line products may define the Access Connection component at each end, but may not specify the interconnection between them. The provisioning process will define a Network Connection component to complete the service. If different technologies are selected at each end, two Network Connections may be required, terminating at some intermediate point in the network, chosen by the provisioning process, where the transition between the technologies can be made.

However, in other examples, for example in products aimed at service providers, Network Connection components may be explicitly specified in the product.

As the above illustrates, Service Components can be combined to provide distinct capabilities which are meaningful and useful to the end-user. These are not necessarily fully-formed products, but can be combined into such products. To enable such capabilities to be modelled, the product model preferably allows Service Components to be organised hierarchically.

In a hierarchy of Service Components, a higher-level component is made up of lower-level components in much the same way as a Product is made up of Service Components. Specifically, a higher-level component specifies a set of lower-level components which combine to form the higher-level component (i.e. the lower-level components represent service functionality which, when combined, yield the service functionality represented by the higher-level component). Correspondingly, provisioning of a higher-level Service Component involves provisioning of each of its constituent lower-level components.

The distinct capabilities referred to above can then be modelled as higher-level components (typically top-level components) in a component hierarchy. This can simplify product modelling by hiding complexity and provide improved flexibility.

Each distinct end-user capability, with a predefined combination of Service Components, preferably also has associated with it a predefined high-level provisioning process in the IDP provisioning layer (described in more detail below). This determines how the given combination of components is provisioned into an end-to-end service. It is where much of the provisioning complexity is typically found, but with the correct choice and structuring of Service Components, this complexity can be systematically addressed by automation.

The fact that there are often not many truly distinct end-user service scenarios at the network resource level, means that there are usually only a few such end-user capabilities that the provisioning system needs to model. The following are four examples that cover a wide range of possible services:

End-user connection to other end-user locations (leased line and VPN)

End-user connection to a telephony, or IT platform (including broadcast)

Network capacity for other service providers

Internal infrastructure capacity

The present product modelling approach thus also has benefits in the automation of the provisioning process. By defining fundamental capabilities as universal Service Components, the high level provisioning processes can also become universal, built into the core provisioning system and eliminating the need for custom processes and code for each new product launch. This is enabled by the correct componentisation of the product model, as captured in the Service Components.

Figure 4:
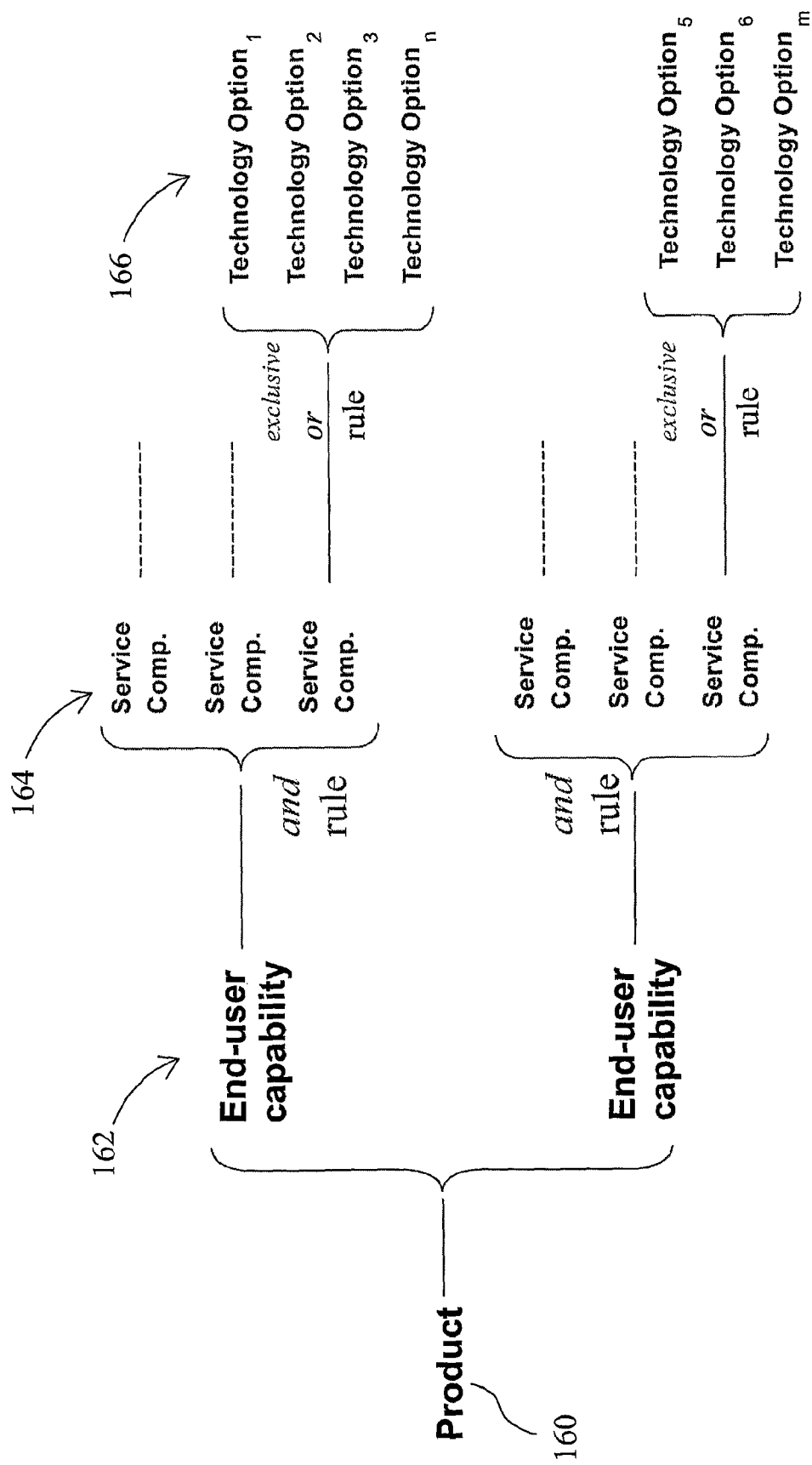
FIG. 4 illustrates how the product model is used to model a product.

FIG. 4 illustrates use of the product model to model a given product.

In the example, Product 160 consists of two distinct end-user capabilities 162. These may be modelled as high-level Service Components as discussed above. Each end-user capability consists of a set of Service Components 164 (as indicated by the 'and' relationship). Each Service Component 164 is in turn associated with a number of Technology Options 166. However, the Technology Options 166 for a given Service Component 164 specify alternative implementation technologies, as indicated by the 'exclusive or' relationship.

Product Families

To enable further organisation of the product catalogue, in preferred embodiments, the product model allows groups of related Products to be modelled as Product Families.

In this extension of the basic model, a Product Family models the overall nature of a product, by defining the end-user capabilities that are used to construct it. The end-user capabilities are expressed in terms of Service Components (such as the service component prototypes set out above), which indicate the services that products of the family can provide. The Product Family can also capture any dependencies between the different Service Components and their parameters. For example, a "Hosted Application" product may need to match the bandwidth and CoS (Class-of-Service) of the Access and Content Delivery components. In effect, the Content Delivery component establishes the connection quality and size required to deliver its content. This dependency is captured in the Product Family.

The Product Family is then sub-classified into individual Products. This is achieved by:

Further specifying values, or narrowing the range of the Service Component parameters Omitting Service Components that are optional within the family For example, a given Product Family may provide "Gold", "Silver" and "Bronze" variants. The Gold Product within the family might specify a higher bandwidth for the Connection component, a more secure form of authentication, higher availability and a license for the 'feature-rich' version of the application, as compared to the Silver variant. The Bronze version may not include a broadband connection, but rely on Internet access through another ISP (Internet Service Provider). The result would be a version of the product that could not be quality assured, but would otherwise remain fully functional. It would also mean that the service could be used from any location with Internet access.

The Use Case described below provides a more detailed example of Product Families.

Portfolio and Capability Management

As described above with reference to FIG. 2, the product model 102 is maintained in two distinct layers. The first, the product catalogue 104, represents the product portfolio as presented to the end-user; the second, the service catalogue 106, represents the network resource capabilities as delivered by technology. The two layers are preferably managed by two separate processes: portfolio management process 108, which includes the definition, modification and deletion of Products and Product families in the model, and resource capability management process 110, which includes the definition, modification and deletion of Service Components and Technology Options. These processes will now be described in more detail.

Portfolio Management

The portfolio management process 108 allows Products available to the end-user to be created, edited and maintained. The Products are defined in terms of the set of reusable capabilities represented by the Service Components.

Changes to the product catalogue 104 are typically frequent, resulting in many minor variants of products aimed at a broad and complex market place. However, much of the variation can often be superficial as far as the provisioning processes are concerned, so by properly encapsulating the Service Components and dividing them cleanly between SML and resource layers, it is possible to add new products by mixing and matching existing components.

In this way, it is possible to provide a flexible product portfolio which is adaptable to changing end-user requirements, whilst giving a high degree of confidence that the resulting products can be operated and delivered efficiently. For example, a broadband Internet access Product, aimed at the business market, can reuse Service Components from a corresponding residential broadband Product, but can enhance the Product offering with higher quality and quantity and additional content. The higher-level provisioning process, based on the underlying combinations of Service Components, can remain the same for both.

The Product Catalogue 104 is the data structure that results from the portfolio management process. It describes Products in terms of both SML and resource capabilities, so should be seen as extending across both layers.

Resource Capability Management

The service catalogue 106 captures the relationship between a Service Component and the technologies that can be used to implement it (the Technology Options). The service catalogue is maintained by capability management process 110. This process classifies each new Technology Option by the Service Component it implements and the ranges within the Service Component parameterisation that it can support. The process also maintains the priority assignments of different Technology Options.

The service catalogue will typically change less frequently than the product catalogue, the rate of change being governed for the most part by the rate at which the underlying technologies change. The service catalogue is updated to reflect the introduction, withdrawal or modification of technologies used in the telecommunications network.

Capability management takes place independently of the fulfillment process. This means that new technologies can be added without disrupting existing technologies, products or processes. They can be added to either improve QoS, or reduce the cost of supplying existing products; quite possibly both. This can be done without the cost, or disruption to the market of a new product launch (though the new technology may also enable new products).

Old technologies can be withdrawn with similar seamlessness. To implement withdrawal, a technology can be reduced in priority in the service catalogue, so that it is only used when there is no other option, or it can be removed completely, so no further services are provisioned using it.

This can provide a powerful mechanism for managed migration from legacy technologies. External network planning/design/engineering processes can add or replace technologies without regard to the fulfillment process, which will continue independently, utilising whatever technology is available at a given time and location, according to their associated priorities. Usually, all that is required is that the service catalogue and fulfillment systems are properly updated with data describing the technology change.

However, it may often be important to fully understand the impact on the product portfolio of withdrawing a technology. This is discussed next.

Technology to Product Traceability

The product model enables useful reporting functions which allow the use of technology to be traced. The product model (using both the product catalogue and service catalogue) can be used to identify:

technologies required to support a given product products supported by a given technology The first is achieved by tracing through the product model from a given Product, through its Service Components and onto the Technology Options associated with the Service Components. These Technology Options then identify the technologies that are capable of supporting the Product. A potential complication is that there may be multiple Technology Options for each Product, so the reporting function preferably identifies all available Technology Options and their ranking in order to fully identify a Product's dependency on technology.

The second is potentially a more complex search process; although each Technology Option will typically appear against only one Service Component in the service catalogue, the Service Component will often be referenced many times in the product catalogue, because Service Components are the basic building blocks of the Products. The search therefore identifies all products associated with the Service Component (and hence Technology Option). As a result, there may be a large number of products supported by a given Technology Option.

The above analysis can be used to determine the impact on the product portfolio of the withdrawal of an obsolete technology.

However, since a product may have alternative technologies as Technology Options, the product may not be uniquely dependent on one particular technology. It can therefore be insufficient to list the Products supported by a given Technology Option. The reporting function therefore preferably also determines:

Whether the Product can also be supported by other Technology Options. The reporting function preferably identifies Products that are uniquely dependent on a given technology. This could be where the telecommunication service has a single supplier policy or where a Product has been designed to exploit unique features provided by specific equipment.

Whether those other Technology Options have a higher or lower ranking. A capable alternative technology may not be a realistic alternative, if it has a much lower priority. For example, TDM leased line technology would typically not be used for residential broadband services.

What the deployment levels of the other Technology Options are. Other technologies may not be sufficiently well deployed to provide a viable alternative.

As an example of the latter, the product model can determine all the products that are supported by DSLAM technology (Digital Subscriber Line Access Multiplexer). In addition, it can state that all of these products can also be supported by MSAN technology. However, this does not mean that the DSLAMs can be immediately withdrawn, because information describing deployment levels of the technologies may show that the network coverage of MSANs is 4%, while the DSLAMs cover 92% of the network, so the products are, in effect, dependent on the DSLAMs.

The deployment levels can be found from a resource inventory (e.g. inventory 62, FIG. 1) or management model maintained by a provisioning process (see management model 382, FIG. 6, described in more detail below), which is analysed to determine the proportion of network locations where a technology is present. Additional GIS analysis will give the network distribution of the technology.

Such information is used to further refine the impact of withdrawing a technology from the network.

Implementation of the Product Model

Figure 5:
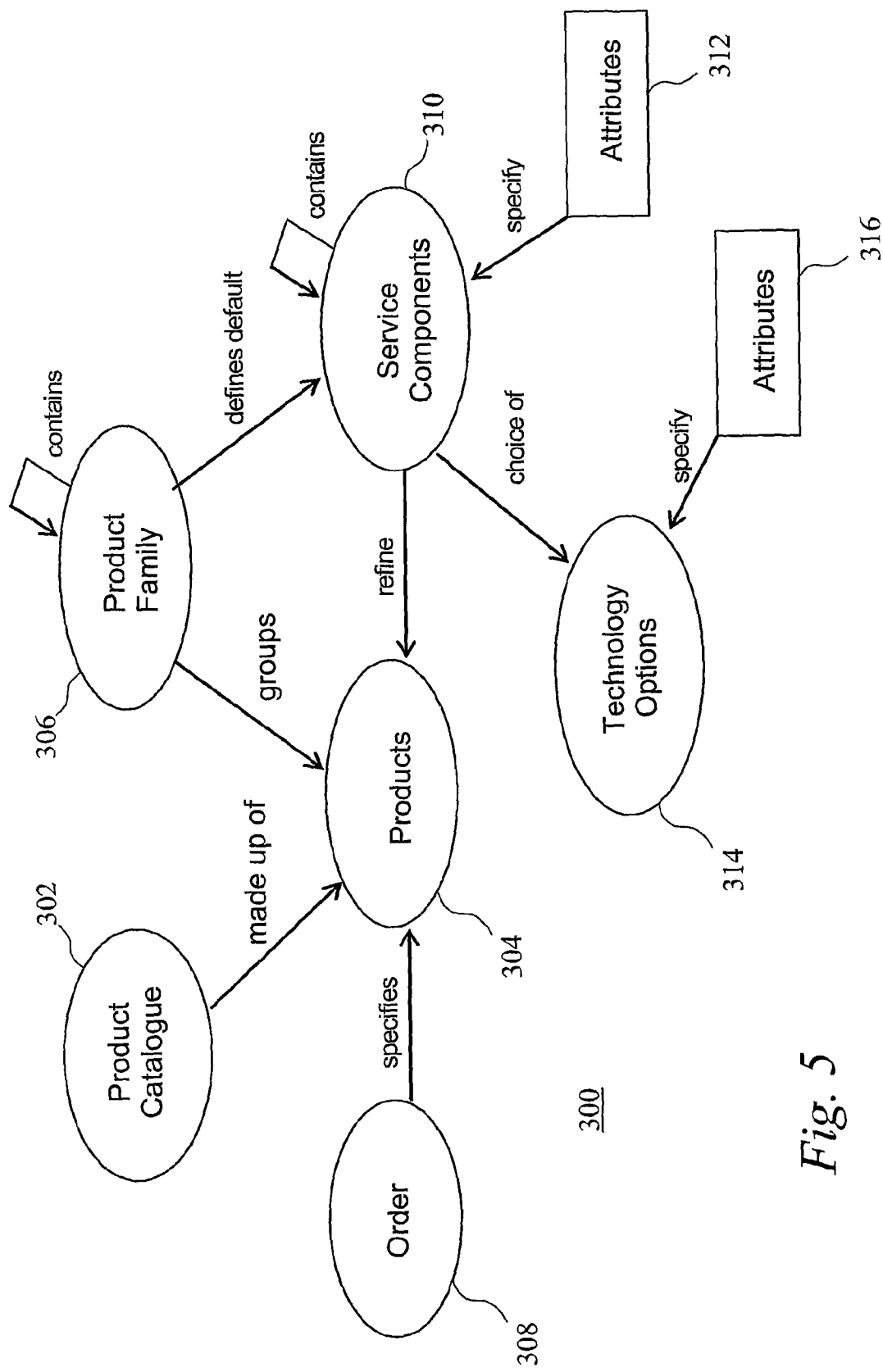
FIG. 5 shows a simplified example of a data model for use in implementing the product model.

FIG. 5 shows an example of a data model for representing the concepts discussed above. The data model is typically implemented as a database. FIG. 5 is in the form of a simplified entity-relationship diagram, in which shapes represent entities in the database, and arrows represent relationships between the entities. The arrows are labelled with a short description of the nature of the relationship. The database may be a relational database (with entities represented as tables), object database (with entities represented as objects) or any other suitable type of database/representation.

The product catalogue itself is represented by a product catalogue entity 302. This can allow multiple product catalogues to be managed in the database simultaneously.

Product catalogue 302 is made up of a number of products 304. As already described, products 304 specify products in terms of a number of capabilities which are meaningful to the end-user rather than in terms of implementing technologies.

Product families 306 group products 304 into families. Product families may be arranged hierarchically, with a product family containing other product families, as defined by the "contains" relationship. Each product family 306 also defines the default set of service components 310 for the product family.

Service components 310 refine the products 304 (by defining the individual service functionality aspects or elementary services which make up the products). Service components can also be organised hierarchically as defined by the "contains" relationship. For example, a top level of the service component hierarchy may be used to represent distinct capabilities which are meaningful to end-users and which can be combined into products, with lower levels of the hierarchy specifying the composition of those capabilities from individual elementary service functions. Attributes 312 specify parameters of the service components 310.

Each service component 310 has associated with it a choice of (one or more) technology options 314 for implementation of the service component (though note that non-resource service components such as SML service components may not have associated technology options as described above). Technology options 314 are again associated with attributes 316 which specify parameters of the technology options.

The above describes a simplified data model for implementing the product model 102 (FIG. 2) previously described, including the product catalogue 104 and service catalogue 106. During use of the product model to process end-user orders relating to specific products, further information may be generated.

Specifically, an order 308 may specify one or more products 304. The order data is typically generated by an order entry system (e.g. order entry process 112). Fulfillment of an order leads to the creation of instance data (not shown) based on the information stored in the product model. This, for example, includes service component instances corresponding to service components 310 but which represent actual services and resources which are to be provisioned in response to the order. This instance data is then used by the provisioning process to provision services corresponding to the order, for example by reserving resources and configuring network equipment, and hence fulfil the order. Service components may be associated with provisioning rules for use by the provisioning process.

In some embodiments, the Service Components and associated provisioning rules are generic and predefined, and the remaining elements are defined by the telecommunications service provider based on their specific requirements.

Interoperability

The product model functionality described can be integrated with existing product management systems. Some such tools provide a generic, hierarchical catalogue, with the emphasis on the business process used to manage the product lifecycle (launch, maintain and withdraw).

Such capability is rarely used in telecommunications services, partly because telecommunications products have often been tied closely to individual technologies, in some cases simplifying their definition, if not their provisioning. Standard product management tools can be used to document the business process for product lifecycle management and to capture the processes as workflow. The product catalogues of such systems can be used in a relatively light way, to key into the more detailed product model described here, where the full complexity of the telecommunications product is captured and maintained.

Product Fulfillment and Service Provisioning

The fulfillment process used for provisioning services corresponding to ordered products will now be described with reference to FIG. 6.

The fulfillment process converts a product definition of an ordered product into an actual service (a service instance) deployed to a particular end-user and consuming specific resources (resource instances), a process also referred to as service provisioning. There is typically a direct relationship between the service and the resources it consumes, often described as the 'service topology', though for connectionless technologies, the relationship may be statistical.

The modelling approach described herein can enable the definition of sophisticated product models, but can also in some circumstances require additional provisioning automation to re-connect the product and technology layers. This additional provisioning functionality is here provided by a provisioning layer referred to as the 'Inter-Domain Provisioning' (IDP) layer. The IDP layer bridges the SML (Service Management Layer) and the domain managers (DM) responsible for provisioning individual resources.

As has been described above, SML aspects and network resource-based aspects of services are modelled as separate types of Service Components—here referred to as SML Service Components on the one hand and Resource Service Components on the other. Thus, the Service Component layer of the product model can be seen as comprising separate SML Component and Resource Service Component layers. This means that it is possible to initiate provisioning in both the SML and Resource Component layers simultaneously. However, provisioning of the SML Component layer will usually only complete once the Resource Component layer provisioning has updated the necessary status information and records.

Figure 6:
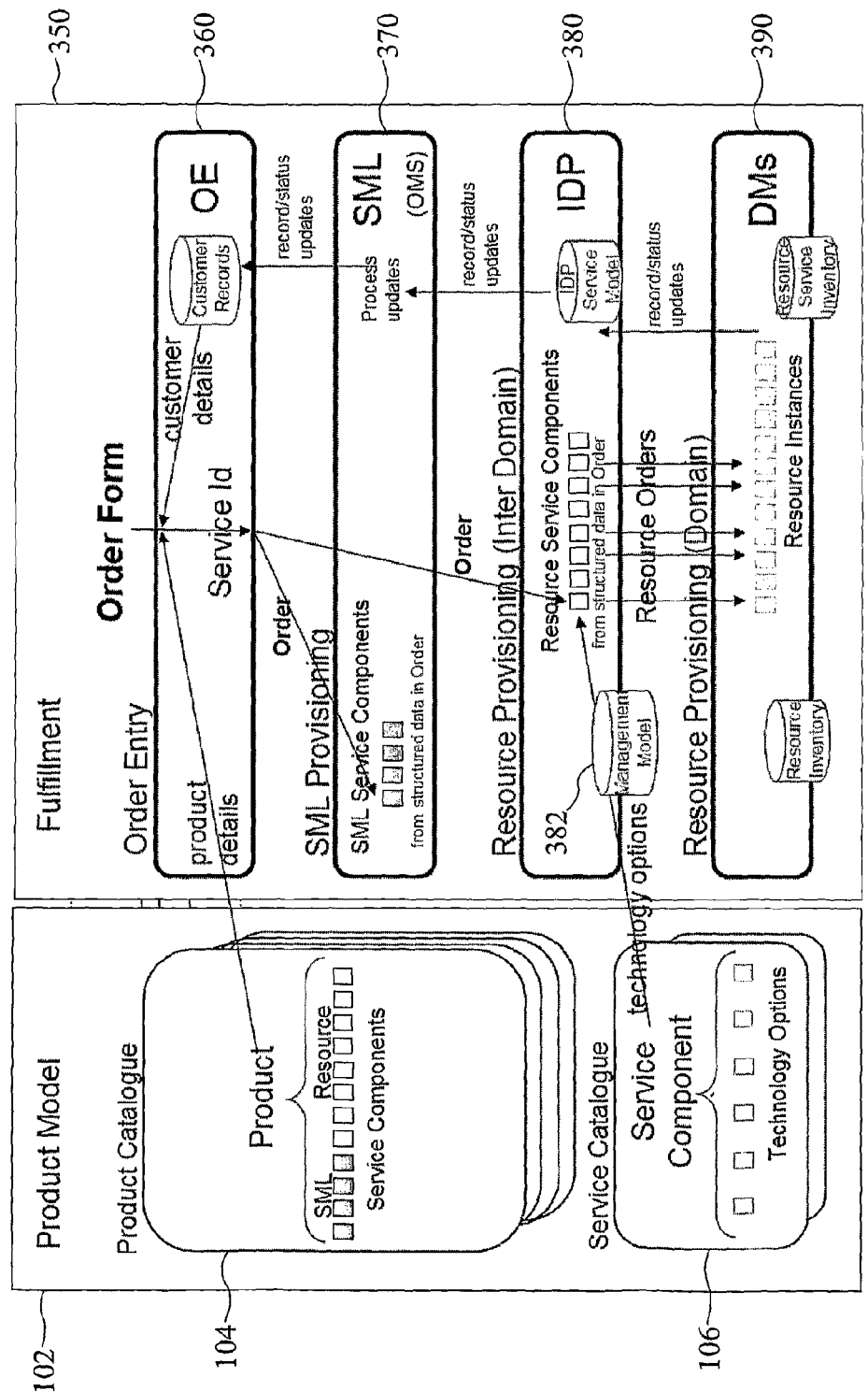
FIG. 6 illustrates the interaction between the product model and a fulfillment/provisioning process.

FIG. 6 illustrates the fulfillment process 350 and its relationship to the product model 102. The fulfillment process has the following layers or stages:

Order entry 360: Here, an order is received from an end-user relating to a given product. Details of the product are obtained from the product catalogue 104 in product model 102. User details are obtained from stored user service records. A unique service ID is generated to identify the specific service instance being provisioned in response to the order. The Service Components corresponding to the ordered product are identified (both SML and Resource Service Components).

SML provisioning 370: The SML service components are provisioned by interaction with the relevant service management systems.

Resource provisioning (Inter-Domain) 380: The Resource Service Components are provisioned in two stages. If a hierarchy of Service Components is used in the model, then the inter-domain provisioning stage 380 (IDP) decomposes the high-level Service Components (or end-user capabilities) into their constituent Service Components. IDP 380 then identifies the Technology Options available for implementation of individual Service Components using service catalogue 106 in product model 102 and selects a Technology Option for each service component based on factors such as priorities assigned to the Technology Options and information from a management model 382 (e.g. coverage information). The IDP layer 380 then issues technology-specific provisioning orders to the domain managers of relevant technology domains as identified by the selected Technology Options. Additionally, IDP layer 380 performs the following functions:

co-ordinating the overall implementation across the domain managers maintaining an inter-domain service model of the provisioned components (instance data)

issuing orders to connect the components to produce an end-to-end service maintaining status and record updates with the SML and order entry layers IDP uses rules that determine the provisioning of each distinct end-user capability (or high-level Service Component) to design the service (see above). It achieves this by taking input from the service catalogue 106 and the requirements in the order and processing them against its own management model 382 of the network resources. This has the effect of translating technology-neutral service orders into domain specific resource orders. These are issued to individual domain managers 390, which implement the service within their own domains and return the end-points to IDP. IDP may need to issue further orders to connect the components.

IDP also determines how subsequent services can be combined, or merged, using existing resources as end-users order further products. This uses information held in the service components and may result in new services that are implemented in existing, possibly enhanced, resource instances.

Resource Provisioning (Domain) 390: This is the second stage in the provisioning of Resource Service Components. The domain managers receive instructions for the provisioning of specific resource instances from IDP layer 380 and perform the relevant technology-specific provisioning steps, which may include sending activation information to network resources to configure the resources for the service.

Technology Selection

The IDP process described above involves a technology selection step when new network resources are required. This uses the ranked/prioritised Technology Options list in the service catalogue 106 to determine the optimum resource for a given location in the network.

The fulfillment process attempts to match the requirements contained in an order for a product (and possibly in the product itself), which are expressed as values for the parameters of the Service Components, to the capability offered by each technology. The highest priority technology whose capability (specified in terms of the parameters) matches the requirements specified in the order and which is available at the relevant location, will be chosen to provide the service. The availability information is present in IDP's management model 382, which lists all the Technology Options present at each location in the network.

The optimum technology for a service solution will depend on a number of factors. The decision process is outlined below:

Firstly, for an end-user service, can existing resources support the order?

If not, what is the highest ranked Technology Option in the Service Catalogue capable of supporting the order?

Is the technology available at the relevant location?

If not, check for the next highest ranked Technology Option. Continue until a suitable candidate is found.

If no suitable Technology Option exists, offer back a lower QoS (Quality-of-Service) option.

Figure 7:
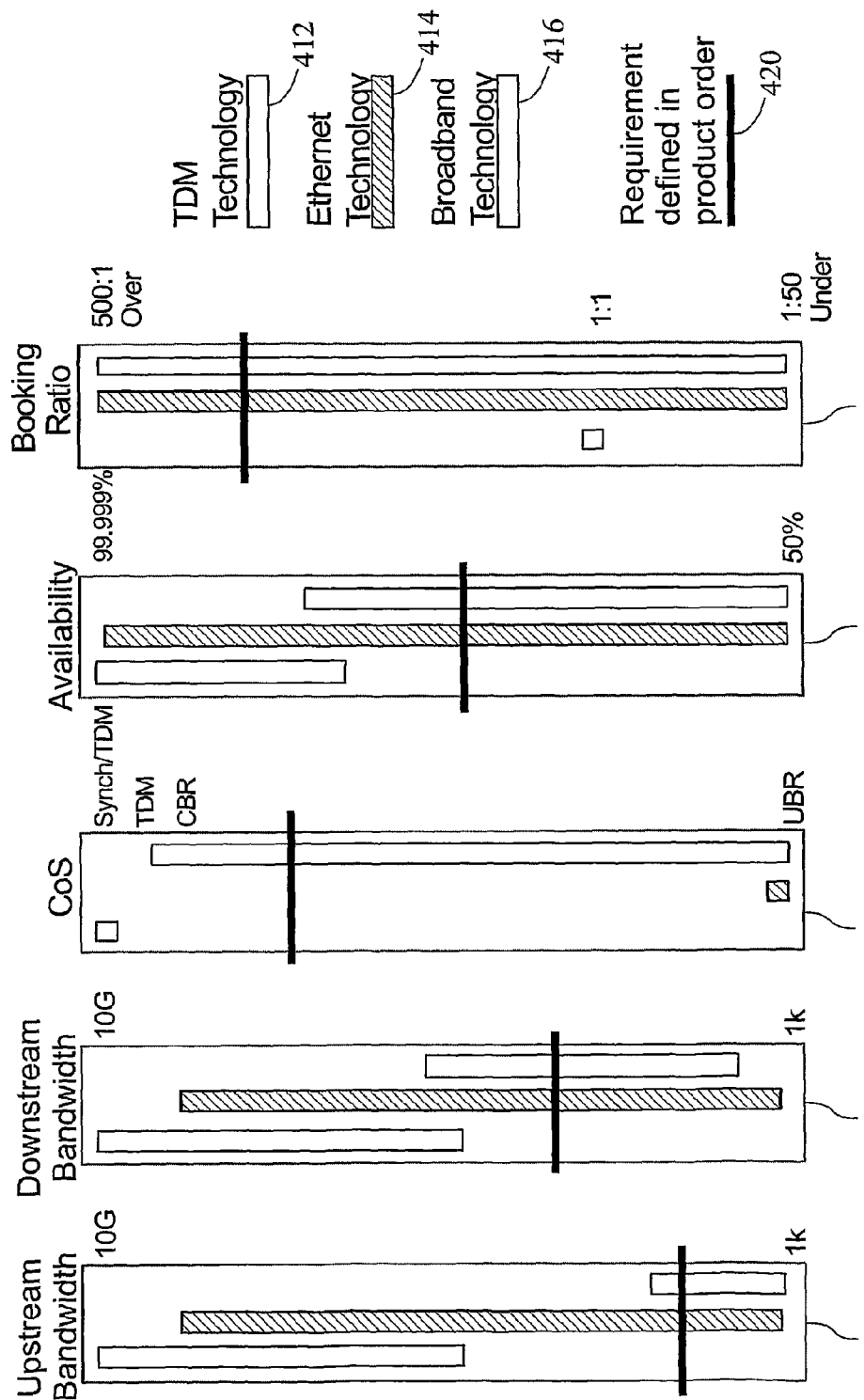
FIG. 7 illustrates a selection process for selecting between alternative implementation technologies.

FIG. 7 illustrates the technology selection step further by showing the relationship between:

A Service Component, with five parameters represented by boxes 402, 404, 406, 408 and 410

Technology Options that are available for implementing the Service Component, each Technology Option specifying a range of values for each parameter over which the Technology Option is usable to implement the Service Component. Three technology options 412, 414, 416 are shown, with supported parameter ranges shown as vertical bars inside boxes 402-410 representing the parameters An order for a Product that selects specific values for each parameter, shown as horizontal lines 420 across the boxes 402-410 representing the parameters.

A suitable Technology Option can be identified by direct comparison of the parameter values of the order to the parameter ranges specified by the Technology Options for each of the parameters 402-410. For example, in the present example, for each of parameters "Upstream Bandwidth" 402, "Downstream Bandwidth" 404, "Availability" 408 and "Booking Ratio" 410, the second and third shown Technology Options ("Ethernet Technology" 414 and "Broadband Technology" 416) both meet the order requirement (because the range specified by the Technology Option overlaps the specific value specified by the order, as represented by the horizontal bar), whilst the first-shown technology option ("TDM Technology" 412) does not. However, for the "CoS" (Class of Service) parameter 406, only the third Technology Option (416) meets the order's requirement, and—being the only Technology Option which meets all of the parameter requirements—is therefore selected. As this example illustrates, instead of continuous numerical parameters, discrete-valued parameters may also be used, and instead of a numerical range, the Technology Options may specify some other constraint on the parameter (for example a specific value or selection of values). In some circumstances, instead of a specific value, the order itself could specify a range or other constraint, and the comparison step would then check whether the range or other constraint specified by the Technology Option contains (or alternatively overlaps with) the corresponding constraint specified by the order.

Sharing and Personalising Capabilities

The provisioning process can be adapted to deal with the situation where the same resource is shared by a number of services. Sharing is a feature of connectionless data services but also applies to the IT; Content Delivery, Authentication and Label components.

Sharing Connection component resources between different services is a way to deliver value-added services rapidly and with minimum additional cost. However, there may be an impact on performance.

However for IT components, sharing becomes a valuable feature in itself. The same Labels, Authentication and Content Delivery components, such as address books and messaging, can be used in common across a number of services. These value-add components become of real use to the end-user when they are independent of the connection mechanism, be it fixed wire, Internet, mobile or radio. Microsoft Passport™ is an example of a reusable Authorisation service.

The opposite is also true. A primary user may add subordinate users to their service and replicate IT components for each. An example would be a parent adding children as independent users. Additional, personalised capabilities can be ordered to enable the children to have their own address books and Label services with associated ring tones and pseudonyms.

Reusing Access Resources

There is a subtlety in the reuse of access resources (i.e. resources relating to Access components). All the layers of the capacity terminate on a single end-user site, so each layer is capable of reuse for the end-user. However, the levels of complexity, manual intervention and cost increase with depth:

Resource Instance—represents managed capacity assigned to the end-user by the fulfillment process to support one or more services. It sits within a technology bearer. Resource Instances can be used for a number of services if they share the same CoS and destination. However the resulting services can only be guaranteed to be simultaneously usable if the Resource Instance is enhanced to support the sum of the requirements, rather than just the maximal value.

Technology bearer—ATM (DSLAM), Ethernet (MSAN), SONET/SDH and so on, deployed over the physical network as a result of service orders to provide capacity for Resource Instances. The technology bearer may support a number of Resource Instances through the access network, carrying connections of different CoS, with different destinations, or for different services. It should be noted that it is typically the Resource Instance that represents the content managed through the network. The capacity provided by the technology bearer will only be exploited to the extent that it is consumed by Resource Instances. Current products usually leave capacity unused in the access to each end-user. The unused capacity can be used to provide additional or enhanced services.

Physical bearer—copper, fibre, cable, radio and so on, deployed to enable the end-user location for services. Multi-service edge devices can allow a single physical bearer to deliver multiple technologies to the end-user. For example ADSL (Asymmetric Digital Subscriber Line) can deliver PSTN (Public Switched Telephone Network) plus ATM (Asynchronous Transfer Mode); and PON (Passive Optical Network) can deliver data plus broadcast video. More typically, a physical bearer will deliver a single technology, which becomes the technology bearer. If the physical bearer exhausts, there are options to deploy multiple physical bearers or a higher bandwidth physical medium, such as fibre. This will often be a manual planning decision, based on local conditions.

Instance Data

Figure 8:
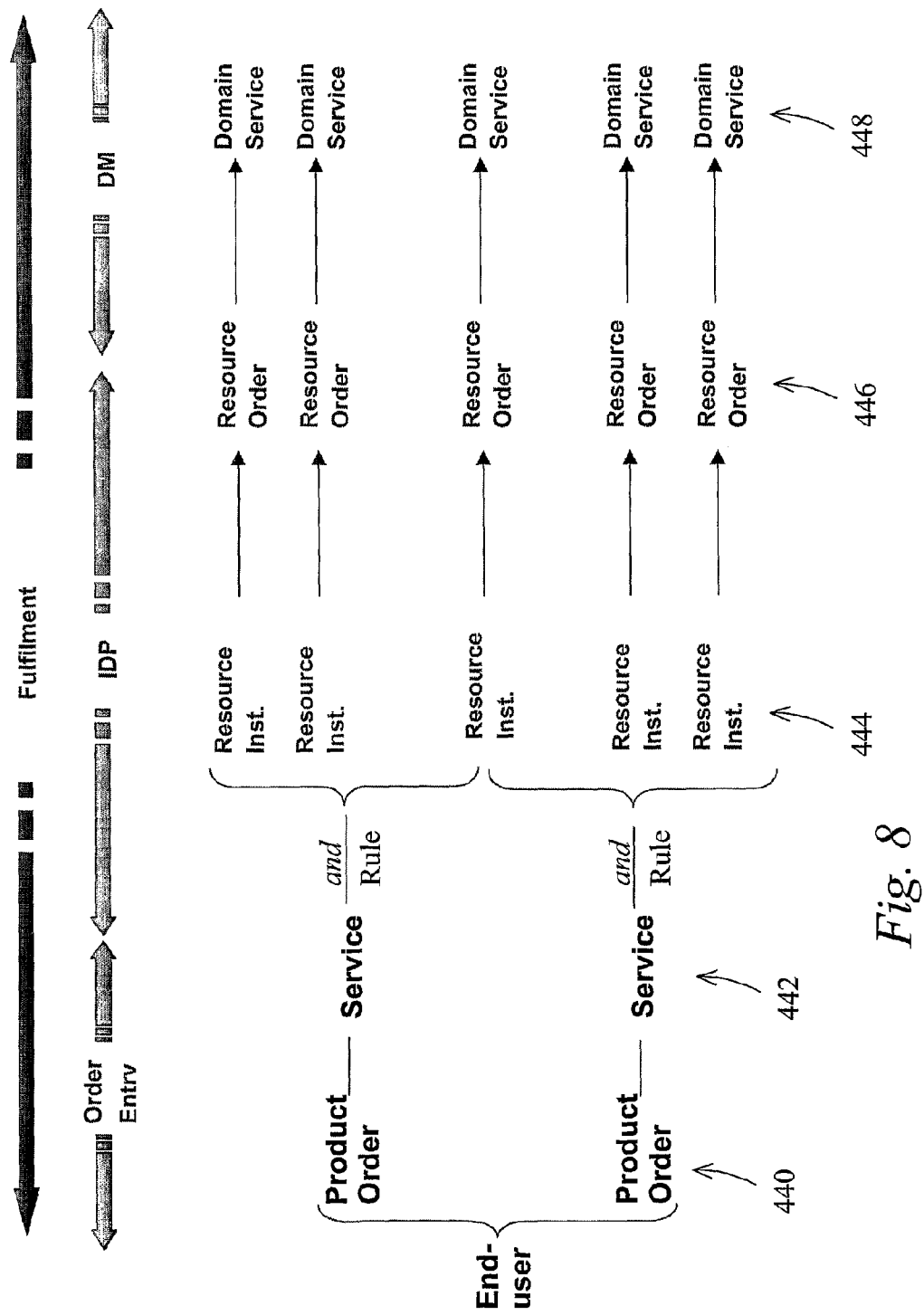
FIG. 8 illustrates instance data generated by the fulfillment/provisioning process.

FIG. 8 shows an example of instance data created as a result of the fulfillment process acting on the product model in response to product orders.

Product orders 440 relating to a given end-user are implemented as Services 442. Services are specific instances of the products defined in the product model. Each Service 442 is implemented by a number of Resource Instances 444. A Resource Instance 444 typically corresponds to (or is an instance of) a Service Component in the product model, as implemented by a given selected Technology Option. As shown, a Resource Instance can be shared by more than one Service 442. Resource Instances 444 are translated into Resource Orders 446 which are passed to the domain managers (DMs) of the selected technologies to generate Domain Services 448. Domain Services are also referred to as Resource Services, and represent specific service functionality provided by given network resources in the relevant technology domain.

Parameterisation of Technology Options

As already described above, it is desirable to be able to compare Service Components and Technology Options on the basis of a range of parameters. These parameters are not necessarily numerical and so simple numerical comparisons are not always possible. Furthermore, Service Components are typically not technology-specific and so should be defined with parameters that, themselves, are not technology-specific. To enable meaningful comparisons to be made, the product model therefore preferably defines generic service parameters that can be used to identify equivalent capabilities in different technologies and allow like-for-like comparison.

Class-of-Service (CoS) and Security Parameters

Currently there is no pan-technology standard for CoS. Each technology tends to create its own standard and this could hinder the creation of a technology-independent product model. What is more, a generic CoS setting will need significant interpretation to be applicable to specific technologies, such as MPLS (Multi-Protocol Label Switching) and ATM (Asynchronous Transfer Mode). Bandwidth has a different interpretation in CBR services such as TDM, where it is defined precisely, as compared to data services where it is defined statistically.

Given a standard, generic set of CoS values, it is usually not feasible to send an order to a technology specific domain manager using technology neutral parameters. A translation step is therefore provided, preferably as part of the interface between IDP 380 and the DMs 390 (FIG. 6).

Overall, there are two requirements.

Firstly, there is a need for a small set of generic CoS settings that fully describe the different types of data pipe required to optimally capacity manage media-rich networks.

Secondly, there is a need to standardise the way each technology translates against the generic metrics, so as to describe their capability in a directly comparable manner.

As for other aspects of the product model, a preferred solution to these problems lies in defining service capabilities in terms of end-user experience. From the end-user's viewpoint, different services typically relate to the delivery of different forms of multimedia and specialist data, in the most effective way, and a suitable generic CoS classification scheme is preferably designed to reflect this. To this end, the ATM CoS definitions (e.g. UBR, VBR and so on) can be useful. They make use of a small set of standard values that are well suited to defining multimedia data streams. For other technologies, such as IP (Internet Protocol) and MPLS, determining a suitable mapping can be a more complex task, but it is generally still possible to map these into a similarly small, manageable set of CoS classifications.

Using such a generic classification, it becomes possible to represent product capability not only in a technology-independent manner, but also in a way that allows the services provided by different telecommunications services to be directly compared.

It can also enable the CoS behaviour to be maintained when implementation of a service transitions between different technologies in the network, such as between ATM and MPLS networks.

Security settings are another area where standardisation of classification schemes can be advantageous. Like CoS, the aim is to produce a defined set of technology-independent security levels that can be translated to any individual technology used to implement them.

The following is an example of a possible generic security classification scheme which could be used by the product model:

Level 0—Public Access (anonymous)
Level 1—Public, Registered Access
Level 2—Personal (address is not public)
Level 3—Private (additional secured access)
Level 4—Secure (additional security measures such as encryption)
Level 5—Sensitive (not networked)

Parameters based on this classification could be provided in both the Authentication and the Public Label Service Components mentioned above.

A security level is preferably specified in the Public Label component because the Public Label component not only defines an address to the end-user's service, for other callers to use, but also restricts callers to predefined user groups within the end-user's centrally managed Address Book. In this example, a Label with Public Access security may be open to anyone who finds the openly published label. Higher levels of Label security may then, for example, require callers to be in a valid user group in the address book and to authenticate themselves with increasing rigour.

This can be compared to the existing solution for conventional (PSTN) telephone systems, where the end-user is given a single number. The end-user can choose whether or not to be listed in a telephone directory, which is in principle visible to anyone. The approach described here can enable the provision of more flexible solutions.

This approach also decouples the security-level classification from its implementation, so that any particular security level can be implemented in a variety of ways, depending on the service and the transaction technology.

For example, a service delivered over a fixed wire is naturally 'personal', without the need for a separate Authentication component. However access to the same service through the Internet will typically require additional authentication, such as a user name and password, to reach the same level of security.

Whether the fixed wire access is also 'Private' depends on the technology being used. Voice over PSTN can be considered 'Private', whereas data services, including VoIP, may require further security functions, such as encryption, to achieve the same result.

Inter-Domain Provisioning (IDP)

In summary, referring back to FIGS. 6 and 8, the service provisioning functionality processes Service Orders to produce Resource Services (or Domain Services). This is a three-layer process.

The top layer is Inter-Domain Provisioning (IDP):
Service Order broken down into zero or more Resource Instances
Resource Orders are generated to implement create/modify/cease of Resource Instances The middle layer is Domain Provisioning:
Resource Orders are turned into Resource Services (i.e. services associated with specific network resources within the relevant technology domain)
Resource Configurations are sent to the activation layer The bottom layer is resource activation:
Resource Configurations are implemented in the resource The IDP layer will now be described in more detail.

Figure 9:
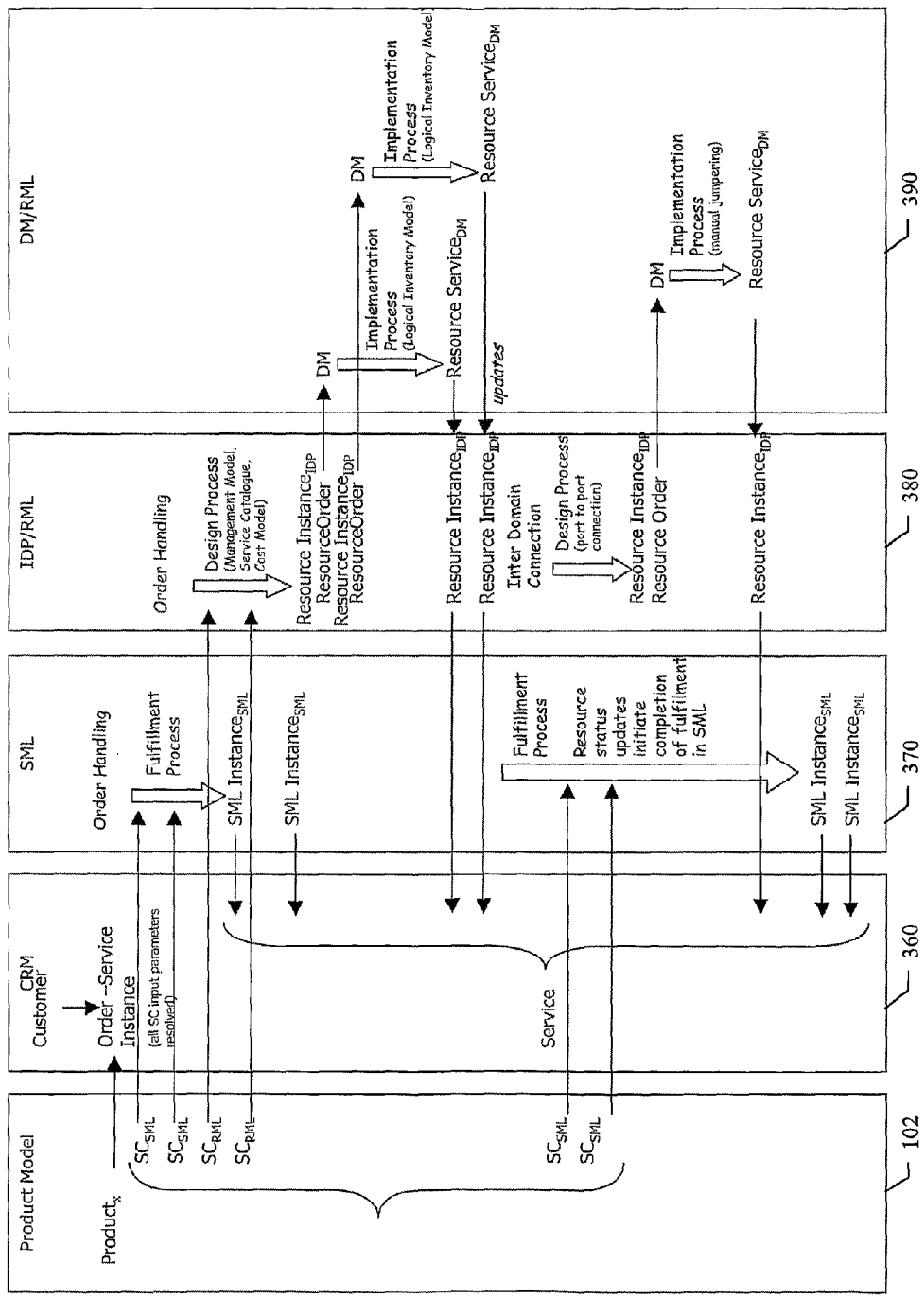
FIG. 9 illustrates the order fulfillment process in more detail.

IDP interacts closely with the product model, and interprets the service requirements of a given service order as resource requirements to enable implementation of a service. This requires:
Decoding the Order into requirements for distinct capabilities
Designing resource services to meet the requirements The process, shown in overview in FIG. 6, is illustrated in more detail in FIG. 9.

An order for a service is created in an order entry process, which is part of a Customer Relationship Management system 360, based on the product definitions stored in the product model 102. The product definition in the product model will specify the features, components and parameters of the given product being ordered. Additional parameter values required to specify the service, which are not defined by the product, are completed in the order entry process. The provisioning process receives the order and creates a service instance in a service inventory (which may form part of the inventory 62). The service instance accumulates implementation details as the provisioning process progresses.

The next step is the order handling process, which passes the order to both the Service and Resource layers 370 and 380. This differs from standard practice, which would sequence the processing from order entry, through to the service layer and then to the resource layer. This serialism is only necessary where service layer decisions need to be made in advance of resource design. The product model can fully encapsulate service and resource functions, which means that both may initiate in parallel. There will be some service functions that are dependent on resource design and these will need to be sequenced after the resource functions. However, by maximising the parallelism, this solution properly exploits the product model's ability to address concerns that a multi-layered solution tends to increase fulfillment transaction times. This solution allows for a rapid response to both service orders and customer enquires without duplicating information held in the resource layer.

The Service Components (SC) are the requirements that need to be designed and implemented. These can progress independently, because they each provide a mutually independent and fully encapsulated component. The relationships between them are already captured by their parameter values, for example common locations and bandwidths. At this stage, there are no technology decisions and the parameter values are technology independent. The Service Catalogue part of the product model defines how each of the Service Components can be delivered by technology in principle. IDP determines the optimal technology option by using the Service Catalogue and its internal Service Inventory and Management Model (see management model 382 in FIG. 6). The normal priority is to reuse existing Resource Instances for both dedicated and shared connections, if there is sufficient capacity. However, this can be overridden if the service provider is implementing a technology migration in the resource. In this case, the churn generated by the order is used to trigger the deployment of a new Resource Instance implemented in the target technology.

The Service Catalogue is used to identify new Technology Options when required. The result of the IDP design decision is to create or modify Resource Instances and to issue Resource Orders to the appropriate Domain Managers to implement the change.

The Domain Managers (DM) use these orders to produce, or modify, Resource Services. The status and implementation details are fed back to IDP and the SML. IDP will hold the end-points of each resource-specific service as part of its Service Inventory, down to port and frame appearance level detail.

The SML will progress any SML activities that are technology dependent, such as delivering CPEs (customer premises equipment) or software.

IDP will issue further Resource Orders for the inter-domain connectivity, where required, connecting between the end-point ports returned by the Domain Managers. This will typically result in manual jumpering tasks. The result is a fully connected solution.

Expansion of Order Data

The data from the Order Entry (OE) process is expanded out to represent:
  The separate end-user capabilities required (as mentioned above, end-user capabilities represent functionality which is meaningful and useful to end users and may consist of one or more service components—capabilities can also be viewed as high-level service components in a service component hierarchy)
  The Service Components (SCs) within each capability A preferred method of achieving this is to create the correct data structures in the OE process, using the Product Catalogue as the source for the data structure.

The SCs set the end-point conditions that define the service, so IDP translates these requirements into Resource Instances by issuing Resource Orders.

IDP uses the particular combination of SCs in an end-user capability to define a set of Resource Instances (RI) that will implement the capability. Each capability is processed separately with its own provisioning rules in IDP. The relationships between the capabilities are fully captured in the parameter values they have in common, such as Service Id and end-user location. The implementation of the full set of capabilities produces the required service.

The Order preferably only contains the information specifying the end-user experience, which is experienced at the end-points of the service. The decoding process in IDP designs any intermediate components that are required to produce a contiguous service across the network. This design is dependent on both the requirements specified in the Order and the state of the networked resource at the time, as represented in the management model.

Decoding End-User Capability

Each end-user capability has its own design process, but they are based on some fundamental rules, as follows.

Some general unification rules are applied between SCs in an end-user capability. This inherent interaction behaviour is built into the IDP system. For each capability within a Product, the following apply.

In order of priority:
1. Access connections to a serving site will connect into Network Connections terminating in the same site.
2. Access Connections will connect to Content Delivery. The network capacity that may be required for this is not part of the product definition, but is an implementation issue for IDP.
3. Access Connections will connect to each other, whether they share a serving site (local turn around), or are served from different parts of the network. For the latter, the network capacity is not part of the product definition, but is an implementation issue for IDP
4. No Network Connections will connect to each other, even if they share a common end-point. A network connection is used to enhance a domain. Their end points are flexibility points in that domain. It is redundant to connect them together, eliminating the flexibility
5. No Content Delivery will connect to each other. Content Delivery is a source and sink of content for consumers, so it is redundant to connect them together as a product offering. Content Delivery sites are connected by Network Connections for resilience and performance.

There is typically no inter-connectivity between SCs in different capabilities (though there may nevertheless be a need to relate the parameters of different SCs in a Product).

The unification rules described here are the most general statement of behaviour. Individual end-user capabilities have specific provisioning rules. Preferably, each end-user capability is associated with a provisioning script or template, which specifies the steps required to provision the capability. In preferred embodiments, end-user capabilities are defined in the product model with only those service components relevant to the end-user experience, and additional service components may be required to provide a complete service. The provisioning script for a given end-user capability may thus include instructions to provision additional service components (in addition to those defined in the product model). These service components are then added to the service being provisioned. The script preferably also includes the necessary steps to connect the service components into a complete capability.

Much of the provisioning complexity is specific to the category of SC being instantiated. As a specific example, the provisioning of an "Access Connection" type Service Component will now be described in more detail.

Provisioning of Access Connection Resource Instances

Provisioning an Access Connection in isolation will generally not produce a viable service, but the description given here serves to illustrate some of the complex sub-processes that apply specifically to the AC component.

A key issue is the relationship between the end-user site within the access network, the distribution frame, an edge technology device and possibly a core device for ongoing connection into the network. This is a problem usually left to manual, in-station physical planning.

The principle adopted in this solution is that as much as possible of the provisioning process should be automated, while recognising that in-station planning is complex, local and often not supported in strategic systems. The solution aims to isolate a small number of self-contained manual tasks in the broader automation process.

Figure 10:
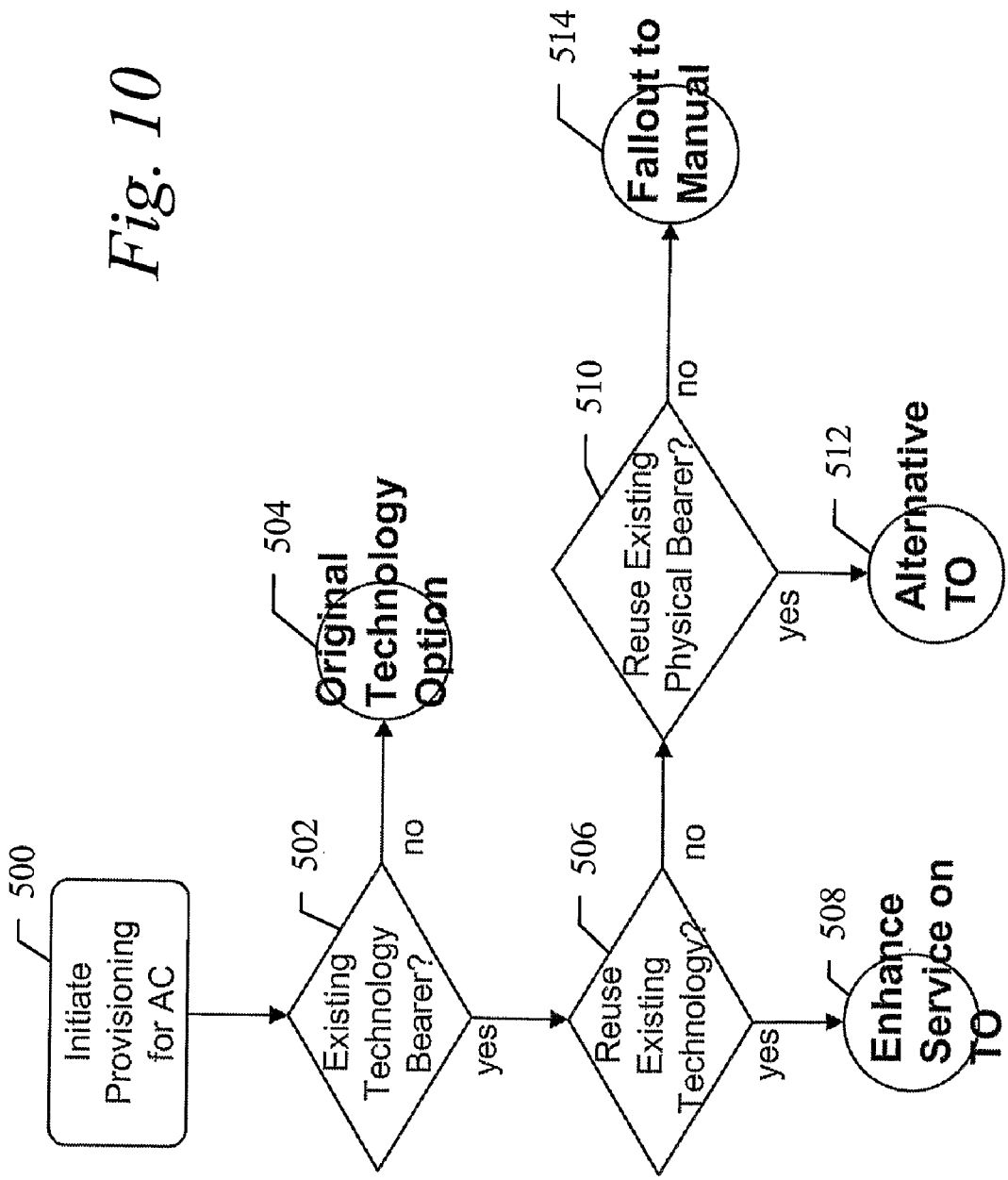
FIGS. 10 to 14 illustrate details of provisioning processes defined for a given service component.

The high-level process for provisioning an Access Connection (AC) service component is illustrated in FIG. 10.

Provisioning of the AC component is initiated in step 500. If an existing technology bearer is available (502) then the process checks whether the existing bearer can be reused for the new AC component (506). If it can be reused, then the AC component is provisioned (508) as an enhanced service on the existing technology option (TO). If the existing technology option cannot be reused, then the process determines whether the existing physical bearer (via which the existing technology option is provided) can be reused (510). If it can, then the AC component is implemented on the existing physical bearer but using an alternative Technology Option (512). If the physical bearer cannot be reused, then the process falls out (514) to manual provisioning (for example to supply a new physical bearer). If at step 502 no existing technology bearer is available then a new technology option is selected (504).

Figure 11:
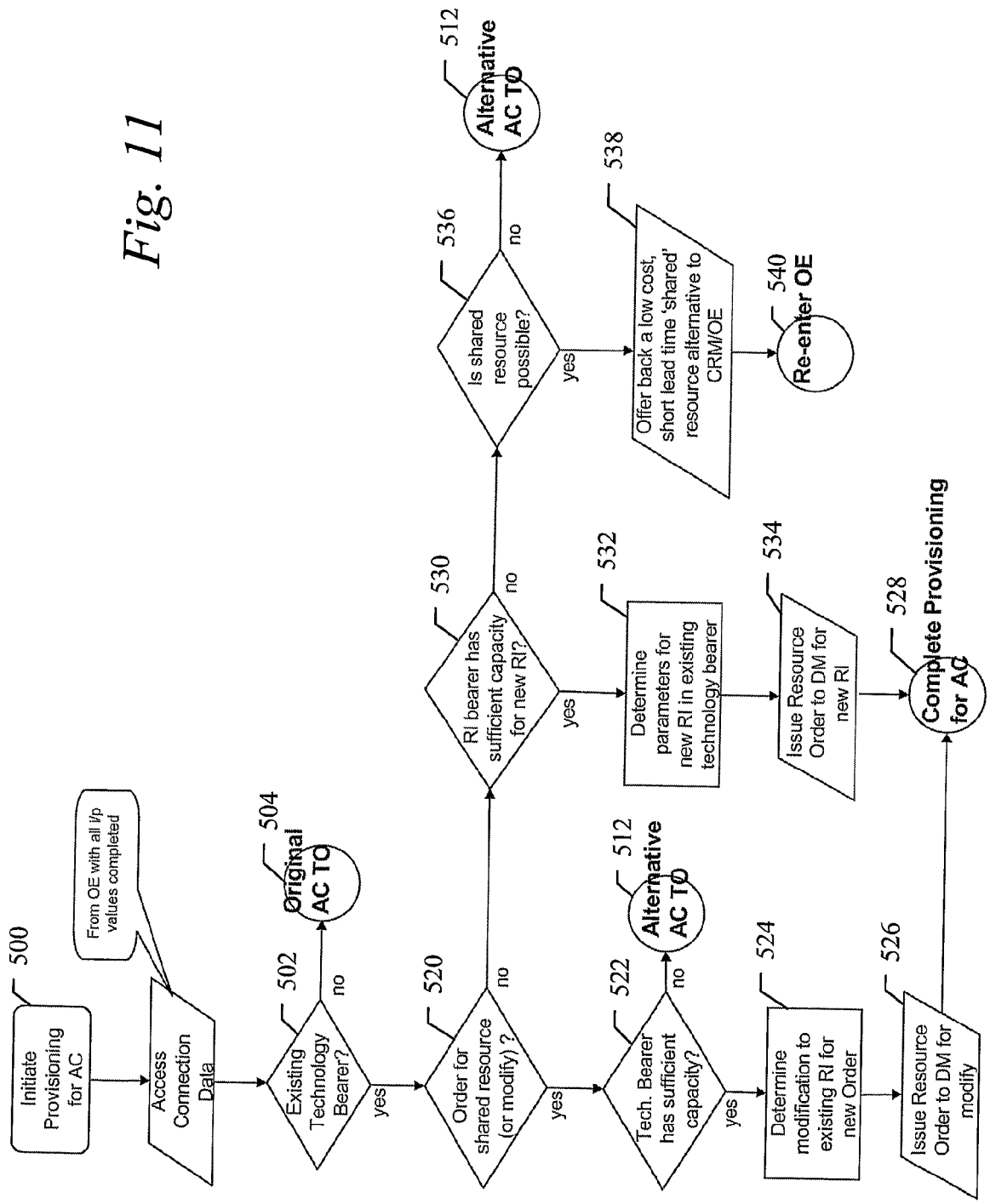

The above process is shown in greater detail in FIG. 11.

If, at step 502, it is determined that an existing technology bearer is available, then the process checks (520) whether the order is for a modified service or a new service using a shared resource. If yes, the process checks whether the existing technology bearer has sufficient capacity for the new/modified service (522). If insufficient capacity is available, then an alternative technology option is used (512). If capacity is available, then the process determines the necessary modification to the existing Resource Instance (524) and issues a resource order to the relevant domain manager (526) to configure the network resource accordingly.

If at step 520 it is determined that the order is not for a shared resource then the process determines (530) whether the bearer of the existing resource instance has sufficient capacity for a new resource instance for the new AC component of the ordered service. If yes, the process determines the parameters for the new resource instance in the existing technology bearer (532) and issues a resource order to the domain manager for the new resource instance (534). Execution of the Resource Order by the domain manager completes the provisioning of the AC component (528).

If at step 530 it is determined that the bearer has insufficient capacity for a new resource instance, then the process checks whether a shared resource is possible (536), and, if so, offers back a shared resource alternative to the ordered service (538). The order may be modified in the order entry process if the end user accepts the alternative offered (540). If a shared resource is not possible (536), then the process evaluates an alternative technology option (512).

Figure 12:
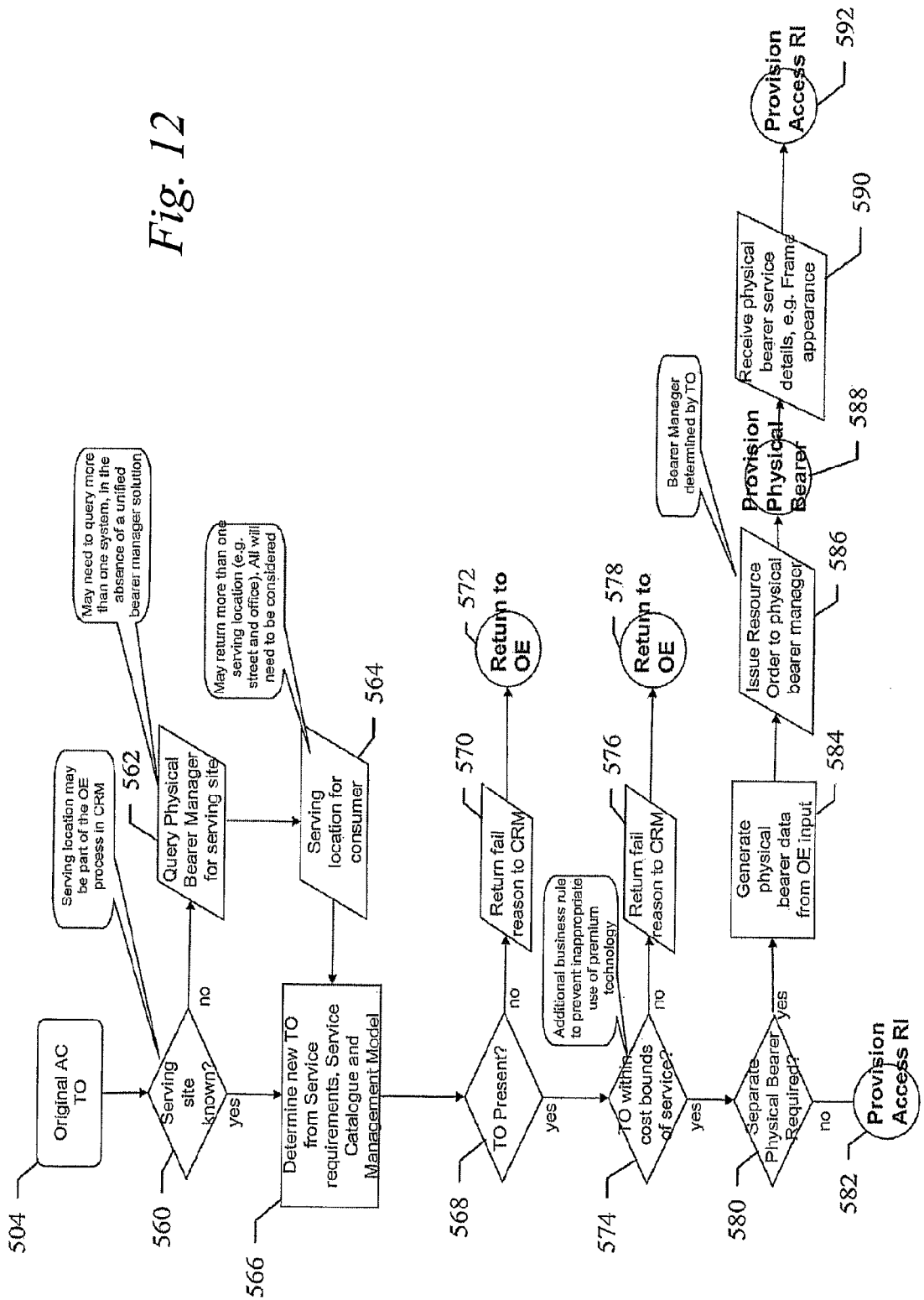

The selection of a new technology option (504) is illustrated in greater detail in FIG. 12.

The process first checks whether the serving site is known (560)—this may have been specified during the order entry process. If the serving site is known (560), then the process determines the appropriate technology option (566) from the service requirements, product model and management model—for example, taking account of the prioritisation of alternative technology options in the product model as described previously. If the serving site is unknown, then the process queries a physical bearer manager for the serving site (562) and receives one or more serving locations in reply (564) before selecting the technology option (566).

The process then checks whether the selected technology option is present at the serving location (568). If not, then the process returns to the order entry process indicating a failure (570, 572).

If the selected technology option is present at the serving site, then the process next checks whether the technology option is within the cost bounds of the service (574). The process again returns to the order entry process indicating a failure (576, 578) if this is not the case.

If the technology option does meet the criteria, then the process determines whether a separate physical bearer is required (580). If this is not the case, then a resource instance (RI) corresponding to the AC component is provisioned (582). If a separate bearer is required, then the requirements for the bearer are determined from the order (584) and a resource order is issued to the physical bearer manager (586), which initiates provisioning of the physical bearer (588), and returns the physical bearer service details (590). The process uses these details to provision a new resource instance for the AC component on the new bearer (592).

Figure 13:
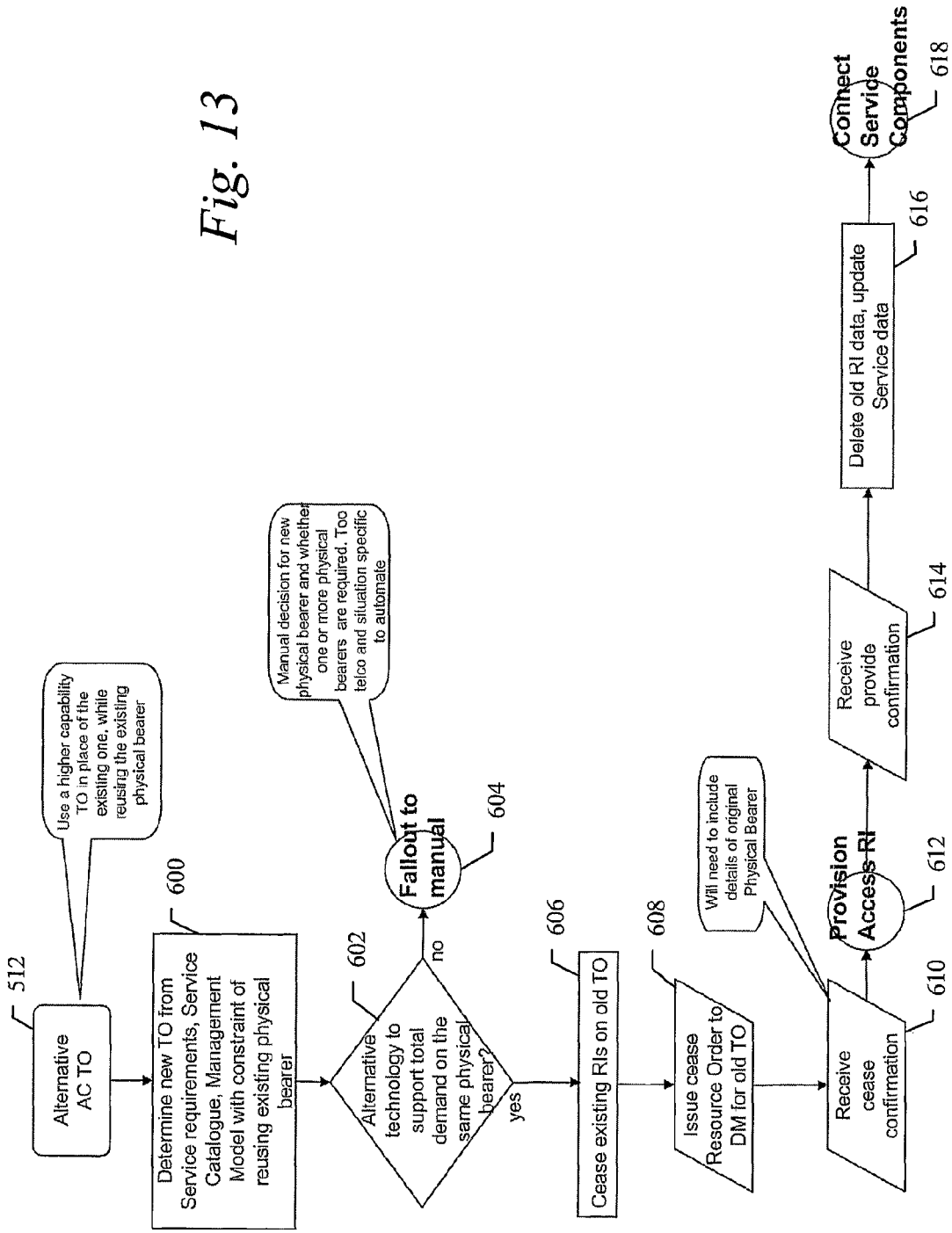

The selection of an alternative technology option is illustrated in more detail in FIG. 13. This process is typically used when a higher capability technology option is to be used in place of an existing one, while reusing the existing physical bearer.

The process first determines the new technology option based on the service requirements, product model and management model, but with the constraint that the existing physical bearer is to be reused (600). Next, the process checks whether the alternative technology should support the total demand for all existing and new services on the same physical bearer (602). If not, then provisioning proceeds manually (604).

If the alternative technology is intended to support the total demand, then the process continues by removing all existing resource instances which use the old technology option (606) and issuing corresponding "cease" resource orders to the domain manager of the old technology option (608) to configure the old technology resources accordingly. Once the process receives confirmation (610) that the cease orders have been processed, new resource instances are provisioned using the selected alternative technology option (612). Upon receipt of confirmation that the replacement resource instances have been provisioned (614), old resource instance data is deleted and the service inventory is updated to reflect the changes (616). The process also connects the provisioned resource instances, corresponding to the service components of the ordered product, as appropriate (618).

Figure 14:
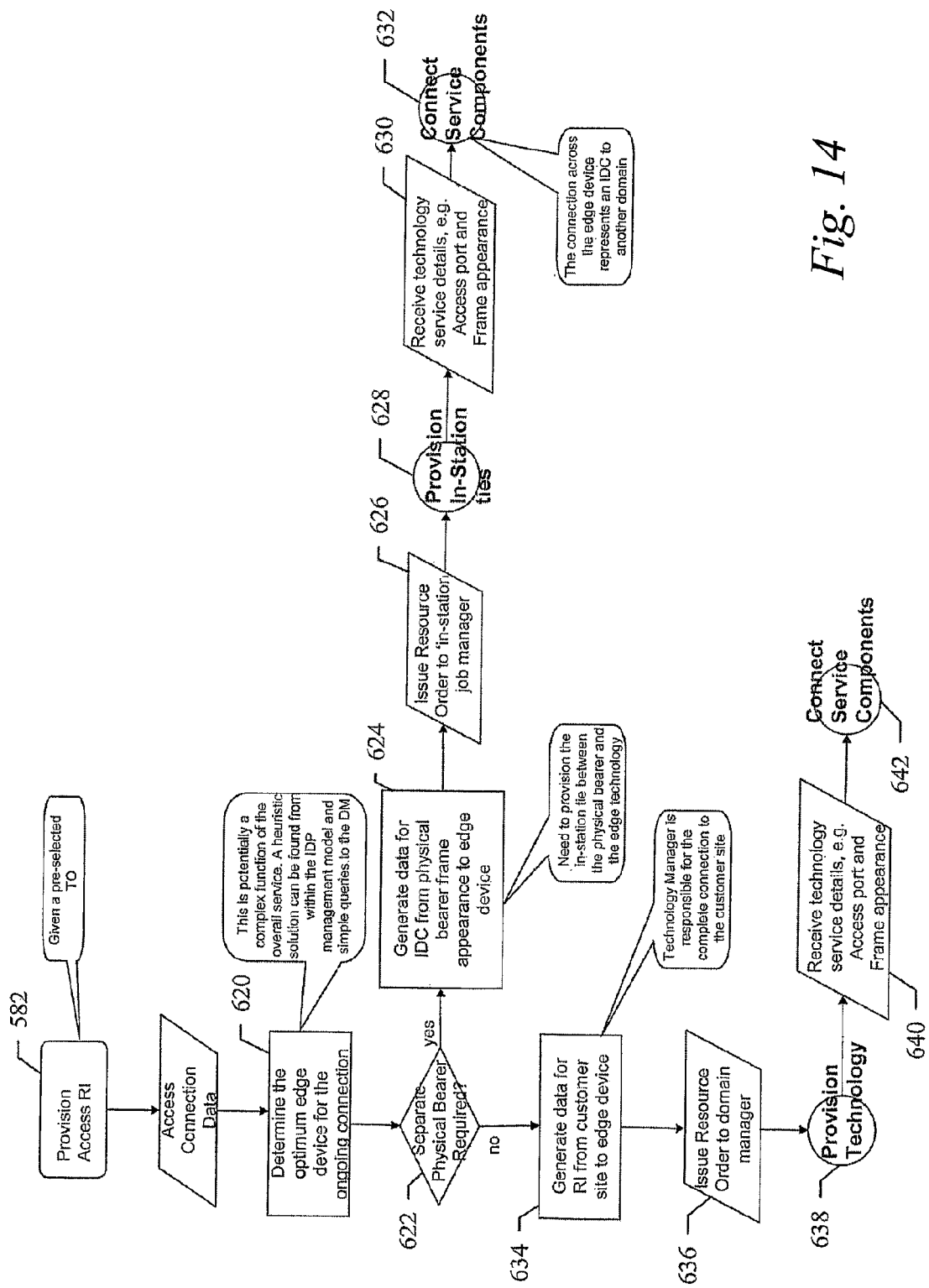

The provisioning of an AC Resource Instance (582, 592, 612) is illustrated in more detail in FIG. 14. This process assumes that a technology option has been selected for the Access Connection.

The process first determines the optimum edge device for connection in step 620. This may be achieved, for example, by querying the management model and/or the relevant domain manager.

The process then determines whether a separate physical bearer is required (622). If yes, then the details of the required connection are determined (624) and a resource order is issued (626), resulting in the creation of the physical connection (628). Details of the connection are returned (630). The process can then connect the AC resource instance to other components of the service as required (632).

If no separate physical bearer is required (622), then the connection details are determined (634) and a resource order is issued to the domain manager (636) which provisions the connection by configuring the relevant equipment (638) and returns details of the provisioned connection (640). The process can then connect the provisioned AC resource instance to other components of the service (642).

The above description illustrates provisioning processes used to provision a particular Service Component, namely the Access Connection component. These processes are merely intended as examples; the details of the provisioning processes will depend on exact requirements and context. Furthermore, other types of service component will have other provisioning processes associated with them.

Provisioning processes may, for example, be specified as code, or as scripts or templates expressed in a scripting language or the like. The scripts or templates can be associated with the relevant service components or technology options and can then be invoked automatically during provisioning. The scripts or templates may be stored as part of the product model or may be stored separately. In one embodiment, since a given technology option preferably implements a single service component, provisioning scripts are associated in the product model with technology options. In addition to provisioning processes, scripts or templates may also be provided specifying processes for removing given service components or technology options, for example when a service is cancelled or is reprovisioned using a different technology.

In summary, to provision a service for an ordered product, the provisioning system thus identifies the constituent service components of the product, selects technology options for each service component, and executes the provisioning scripts associated with each service component and/or selected technology option. The provisioning process also generates service instance data which is stored in a service inventory, including a service instance corresponding to the ordered product, and resource instances corresponding to the technology options selected to implement the service components of the product. During provisioning, resource orders are generated from the resource instances and passed to the domain managers for the relevant network technologies. The domain managers implement the required changes in the network by configuring the network resources accordingly, for example by transmitting configuration data or instructions to the relevant network devices.

The approach described herein enables the service provider to define a set of service components and implement and test provisioning processes for each defined service component. Products can then be built from those service components without having to separately define new provisioning behaviour for each new product, thus simplifying and accelerating the rollout of new products.

Examples of Application and Implementation of the Product Model

The product model as described herein provides a flexible facility supporting the definition of products, the processing of product orders and the provisioning of services.

In preferred embodiments, end-user capabilities are used to specify capabilities that are usable by the end-user, usually constructed from either one or a pair of service components. A service component itself need not be end-user capable and typically an Access Connection service component needs to be paired with another component so as to specify what the access connects to in or across the network and hence what service is delivered to the end-user. A product will be a package of such end-user capabilities, as illustrated in some of the examples given above.

A product family is initially defined using end-user capable service components and the relationships between the parameters of those service components. Not all end-user capable service components in a family may be mandatory in a product; the product family preferably defines which are mandatory. Subsequently any number of products can be defined within the family, taking on the mandatory components and relationships of the family, further refining the parameter values and ranges and determining which of the optional components are to be included. The specification of service component prototypes, product families and products are a user activity which can be exercised directly through a user interface, for example by a product manager, or automatically over an electronic interface, as part of the product portfolio management activity (see item 108 in FIG. 2). It should be noted that the term "user" in this context refers to the user of the product management and order fulfillment system, which is typically the telecommunications service provider. This is distinct from the "end-user", which is the user of the telecommunications services (i.e. the customer of the service provider).

Service Components themselves are the core set of distinct 'types' of component and in a preferred embodiment are represented as meta-data in the product model database. The meta-data determines the parameters that the service components will have, which set of parameters need to match the related Technology Options and whether the component is end-user capable. Any number of service component prototypes can be generated simply using the underlying meta-data, with the prototype entities taking on specific parameter values or ranges. The specification of the service component types is a more complex activity typically associated with the configuration of the product management system 100 by software integrators or super users. For example, equivalent technology option types are also preferably configured at this stage.

Service component parameters can be specified to be optional when applied to a product family and product. Furthermore, the parameter may be defined as constraining or default. When a service component is used in a product or family specification, a constraining parameter will set a bound within which further refinement of parameter values or ranges must remain. A default value is free to be changed.

Technology Option types are represented in meta-data with parameters and the mapping between these parameters and the comparable parameters in the service component meta-data. This mapping is used to compare the requirement specified by a service component with the values offered by a technology option in order to determine if a specific technology option can satisfy a specific service component. Specific technology options are defined from the technology option type meta-data and this is typically a user activity, exercised directly through a user interface, or automatically over an electronic interface. This specification (shown as capability management process 110 in FIG. 2) is part of the strategic planning activity of the service provider, where the service provider, or infrastructure provider, determines how technology is used in the network and applications platform.

Each of the user-specified entities in the product model have a lifecycle that allows them to be specified and brought into service, so they can be used to specify other entities, both within the product model and in order fulfillment/provisioning where they are used to specify orders and the services which are created and modified by orders. They can also be withdrawn from service so long as no other in-service entity is dependent on them. States of 'pending in service' and 'pending withdrawal' support the lifecycle management. Entities can also be deleted, once no longer required after withdrawal, or abandoned during the lifecycle, with the same constraint. Where required, entities that are modified will result in the creation of new versions, with incremental version numbers, rather than replacing the original. This enables earlier versions to continue to be used within the system. If earlier versions are no longer used or referenced by any other entity, they can be deleted. Withdrawn (or 'pending withdrawal') entities may still be referenced by other entities, however they cannot be used in the specification of further entities.

The resulting product model is not only editable, but preferably fully browsable in a graphical user interface by following the connections between entities to the full description of the entity, including the links the entity has to other entities. Following these links between entities is a powerful means of browsing the model as it demonstrates the interdependencies. In addition, each entity is also listed by category and accessible directly for browsing through the list.

Order Fulfillment

In preferred embodiments, an order management system is provided which allows entry, modification and cancellation of orders. The orders relate directly to the product definitions in the product model, and fulfillment of orders (by service provisioning) is again by reference to those product definitions. To assist in the automation of these functions, in some embodiments an interface component is provided which receives orders, relates them to the product model, and initiates their fulfillment. The interface preferably enables "lights-out" provisioning, i.e. fully automated provisioning in response to a product order. The interface is referred to herein as the "Order Fulfillment Adapter", and will now be described in more detail.

The Order Fulfillment Adaptor, or OFA, is an XML based interface to be used by the Order Management System for interfacing into the Product Model for order fulfillment. The OFA supports a set of operations around an order, including "create", "modify" and "cancel" operations. An order can be related to an optional subscriber. Orders are received from an order entry application encoded in an XML format.

The OFA uses the product-to-service component relationship to create a series of service component instances against the order which capture not only the service components and their specified parameters, but also the optional service components, and unspecified parameters. At order entry time, the order manager specifies the parameter values not specified in the service component itself, and the OFA creates the order objects, the service and the service component objects to reflect the order. This instance data is stored in a service inventory (which may, for example, form part of a general inventory 62, or may be separate).

Once the order is being fulfilled, the technology options chosen to fulfil the order are recorded against each service component instance. Furthermore each project created to fulfil the order is maintained against the service component instance. Finally, as part of the fulfillment process, services will be created by both the OFA itself and the design process which should be related back to the service components, thereby allowing the order manager to see inventory instances which arose out of the order process relative to the service components themselves.

The OFA provides the following order operations to the order management system:

Construct Order—Creates a new order based on the product chosen, and the order XML. An order object is created, and the service components related to it are constructed which represent the order XML. In constructing an order, a service is automatically constructed and associated with the order.

Check Order—Checks if the order requirements are feasible given the technology options available. Checks the order service component parameters against the technology option parameters, and their feasibility restrictions to ensure one or more are feasible. It also runs a capability callout to ensure any feasible technology options are capable of handling the order.

Realize Order—Uses the product model infrastructure to choose a technology option, and start the provisioning process for an order by invoking the provisioning scripts or templates for the technology option.

Modify Order—Used to modify an existing order which has either failed the Check Order operation, or is in fulfillment and requires modification, or is fulfilled and requires upgrade. It changes the service components of the order. It is also used to upgrade an order which is fulfilled if it is still within the bounds of the product parameter definition. Upgrading an end-user order can be either to add/delete a service component, or modify the order parameter values if the order is still within the bounds of the same product and version. It will create a new order and add the modified service components against it.

Cancel Order—used to cancel an active order which is no longer required by an end-user. For orders which are inactive, and still being fulfilled, this operation will stop any further provisioning actions against the order. It puts the order in the 'Abandoned' state. Provisioning steps that have already been performed may need to be reversed.

In addition operations may be supported to facilitate the validation of the product model in an external system, be it an order management system or an external product portfolio manager. These operations are read only—meaning they report the state of the product model but do not modify it. The following is an example of such an operation:

Get Product Details—used to get the details of a product in terms of its state and lifecycle and its service component parameters, and their supported values or value ranges.

Can also include the technology options available for each service component, and their supported attribute values or value ranges.

In addition to these operations are order events which are asynchronous events from the fulfillment process to the Order Manager to indicate the following actions in the inventory:

Status Update—indicates that the status of an order has changed. The status of an order changes as it progresses through the provisioning process, as discussed in more detail below.

Feasibility Check Event—indicates that the check order operation has completed, and shows if the order is feasible or not.

Parameter Update Event—indicates when a parameter of an order is changed by the fulfillment process itself.

The order lifecycle is tracked to maintain where the order is in the process between the order management system and the fulfillment/provisioning system. These operations and events change the order lifecycle accordingly.

Figure 15:
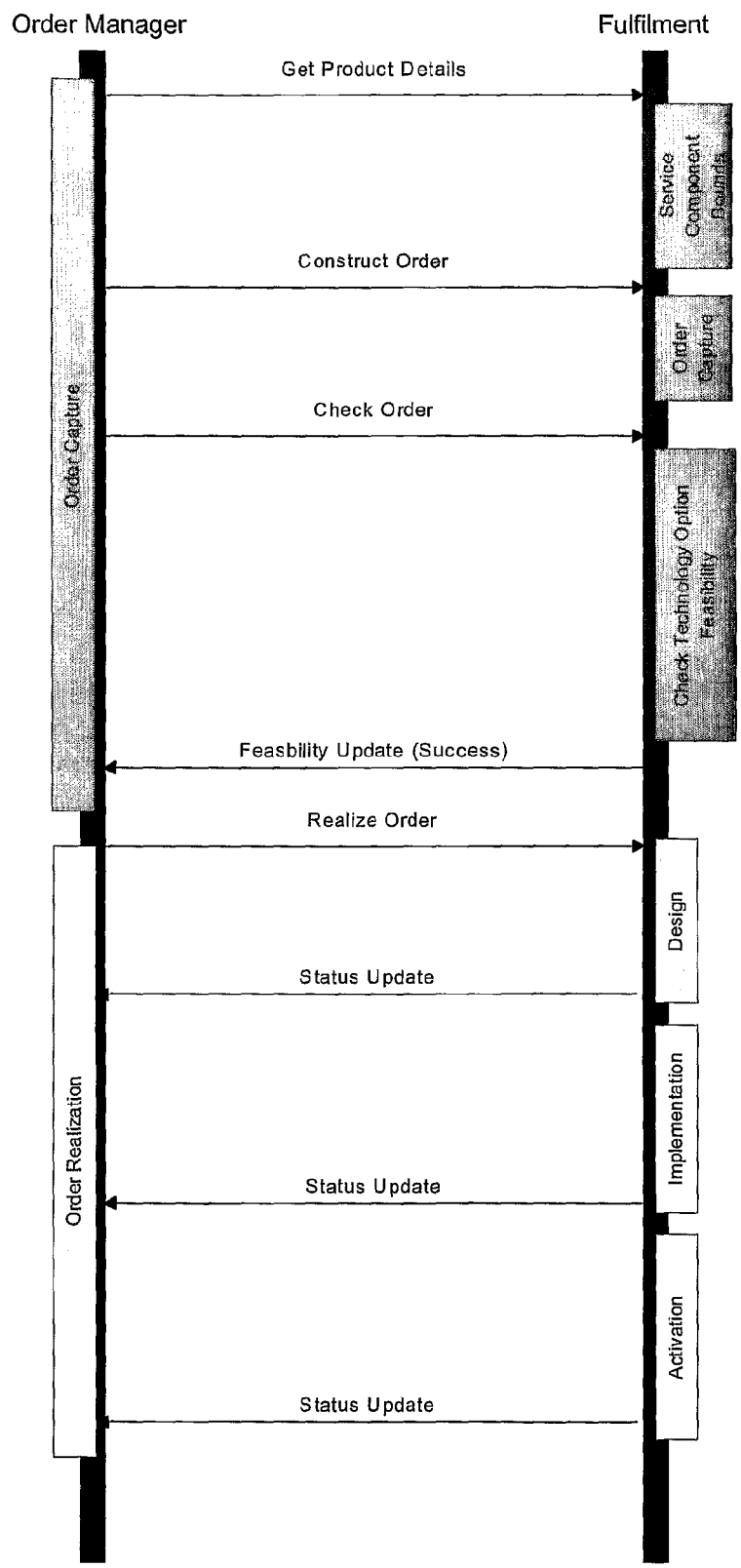
FIGS. 15 to 17 illustrate the interaction between an order manager and the order fulfillment process.
Figure 16:
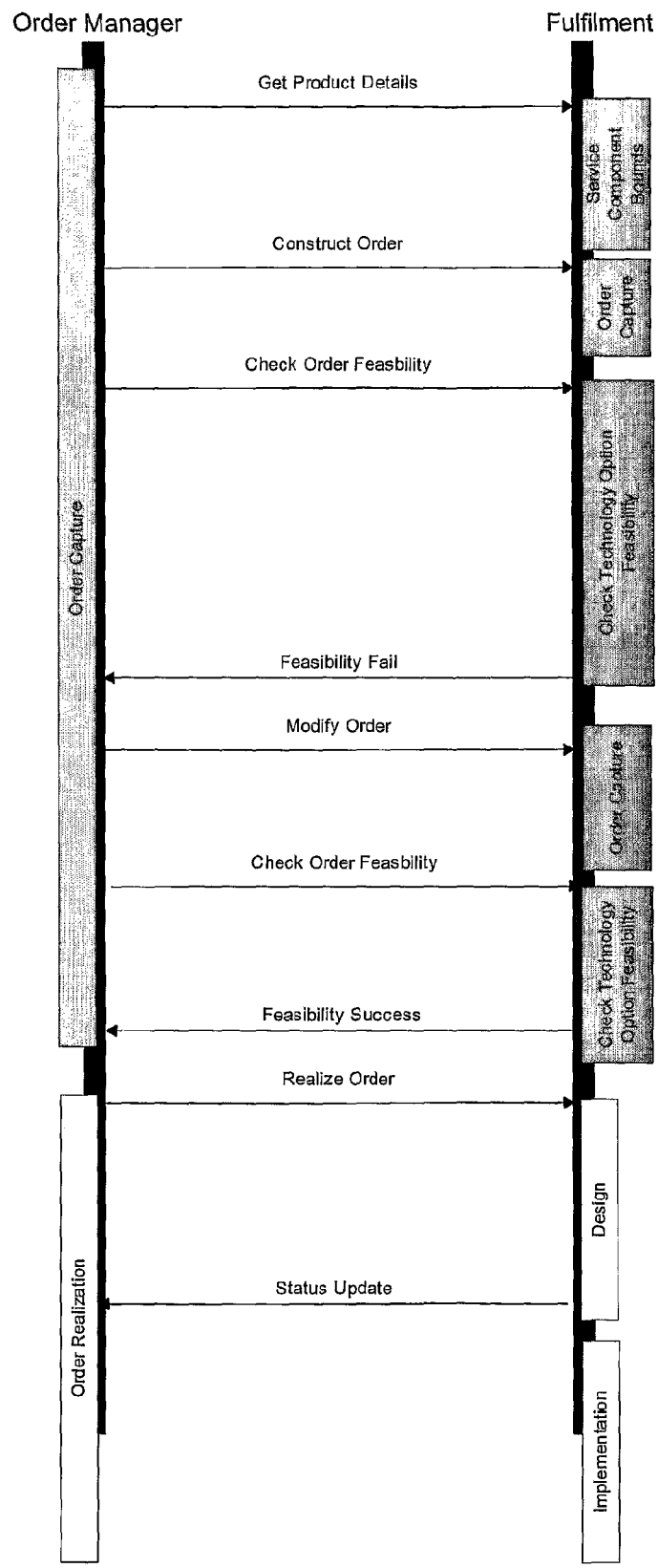
Figure 17:
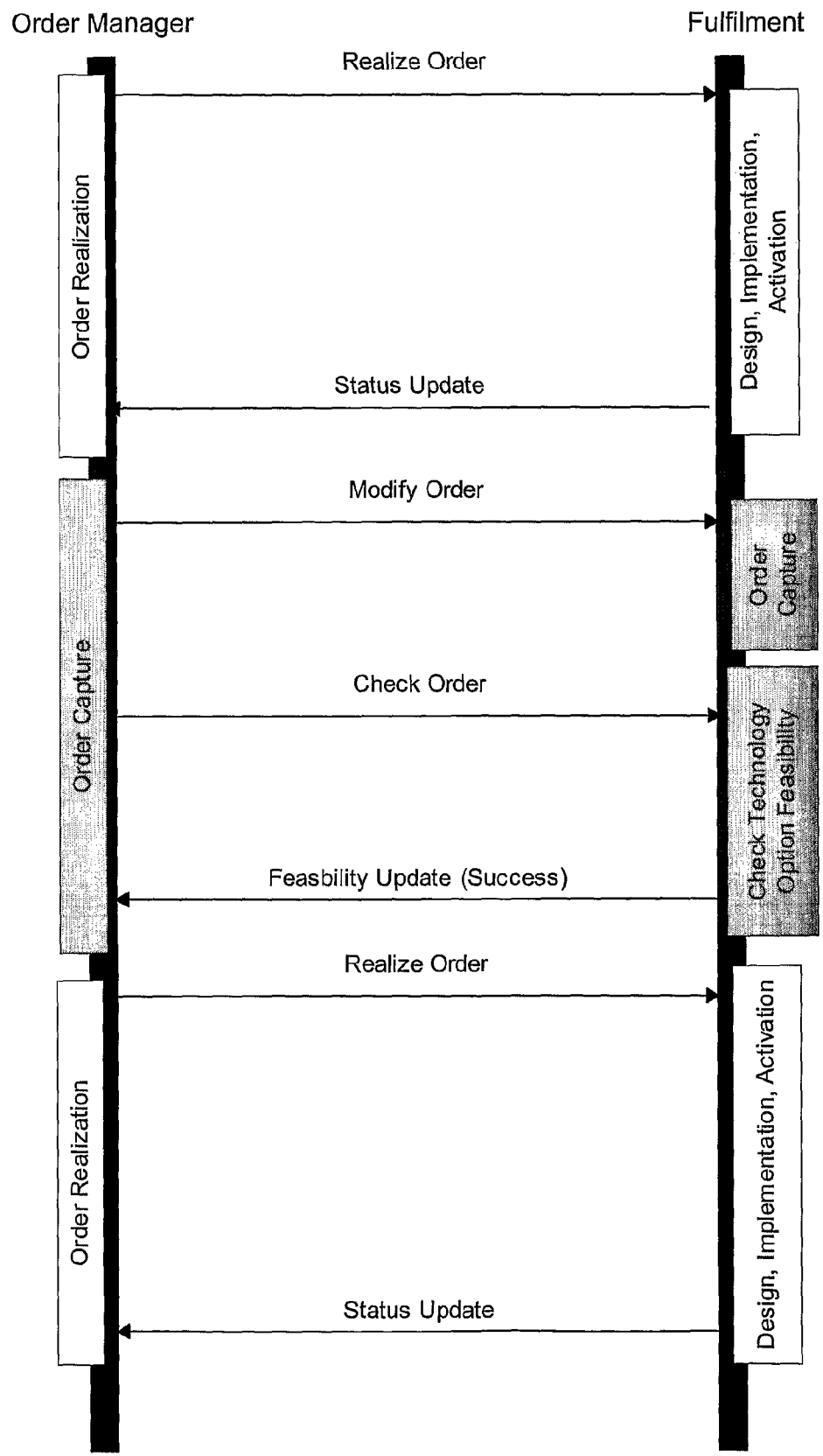

FIGS. 15 to 17 give an indication of the use of the various operations provided by the OFA. FIG. 15 shows the scenario where an order is immediately feasible. First it shows the Order Manager (OM) checking the product configuration (this is an optional initial step). Then, the construct order operation is carried out, where the OM specifies the order type and the product for the order. The feasibility check is then performed against the order using the product model, and an asynchronous notification is sent back to the OM that the order is feasible. The Realize Order operation is sent, which re-executes the feasibility check, and then starts the provisioning process immediately, unless a future fulfillment date is set. Various status updates are sent as the provisioning process progresses.

FIG. 16 shows an alternative scenario where the feasibility check fails, and the order has to be modified. In this sequence of events, when the feasibility fails, the Modify Order operation is used to modify the same order as before. The order parameters can be modified, and the feasibility check run again to ensure the new order parameters can be feasibly fulfilled.

The final example shown in FIG. 17 illustrates an upgrade of an order. A modify order operation can be used to upgrade an end-user order which is already 'Active' but maintains the same product restrictions. For instance, the product may allow a range of bandwidths to be supported for connections under the same product, or one or more value-added services may be added or deleted to/from an order where those services are optional to the product. In this case, a Modify Order operation is issued from the OM. A new order object is then created with the changes in the service components, but the new order object maintains a relationship back to the original order. The feasibility and realization of the order are the same as in the other scenarios except that when the modified order is placed in the 'Active' state, the original order is placed in the 'Upgraded' status.

Upgrading of an order is preferably only used with orders within the same product. If a product upgrade to a new product is required, the original order is instead cancelled, and a new order issued for the new product.

The various operations of the Order Fulfillment Adapter will now be described in more detail.

Construct Order

The Construct Order operation is used to create an order: It takes in an order type, an optional subscriber ID, the product name and/or Product ID, and the order parameters. Though in preferred embodiments the product model may hold multiple versions of a product, a given version is preferably identified as the "in service" version of the product. An order for a product then does not have to specify the product version; instead, the 'in service' version is automatically used.

The operation may also take the ID of the order in the OMS, and stores it against the order object. It creates an order object and a service object, and adds the service component instances to the order to reflect the details of the order. Optionally the technology options can be forced through with the order details in which case the technology option chosen is kept against the service component. The order is created with status 'Created'.

The operation may return a fulfillment order ID, an ID of the created service instance and, if the order could not be fulfilled, an error code, error ID and/or error message.

Check Order Feasibility

The Order Feasibility call checks to see if the order can be fulfilled. It checks the technology options to see if one is available and can fulfil the order given the order parameters (the feasibility comparison). It also runs the capability callout on any feasible technology options to ensure it is network capable.

If a specific technology option has already been designated in the Construct Order operation, then only that technology option is checked.

The order status is put into the 'In Feasibility' state at this time, until the notification of feasibility is complete. Since order feasibility may take time, the return status of the feasibility check is communicated through an asynchronous call back to the order manager (see the example above).

Modify Order

The Modify Order operation is used to change the order details for an order which cannot be fulfilled (based on the feasibility check), to modify an order while it is being provisioned, or to upgrade an order. It takes in the order to be modified, and the order parameters. It can optionally force the technology options for the order. If the order is in the state 'Created', then the attributes are changed accordingly. If the order is 'In Progress', then the design, implementation or activation phases need to be considered. A callout is defined in the OFA which allows an action to be defined on a Modify if the order is 'In Progress'. If no such callout is defined, then a Modify cannot be placed on an order which is 'In Progress' (i.e. the transition to 'In Progress' is the point of no return in fulfillment).

The Modify Order operation allows upgrading of an order for a subscriber if the order is 'Active' within the bound of the same product (and same version) which includes the following:

Adding a service component which was optional
Deleting a service component which was optional
Changing a parameter of an order, as long as it remains within the bound of the original product.

The operation takes the new order details and creates a new order which is a child of the original order. The new order status is 'Created' until the upgrade order is realized.

Realize Order

The Realize Order operation is used to start the fulfillment of an order. Typically this will result in design, implementation and activation phases within the fulfillment/provisioning system itself. The order is put into the status 'In Progress' until the order is activated (and put into the 'Active' state once the order has been realized in the network by the provisioning system). The fulfillment status is communicated by way of the Status Update event from fulfillment/provisioning back to the order management system. An order realization can be queued for a future date by specifying a fulfillment date, in which case the order will be automatically realized at the future date by the OFA.

When the Realize Order operation is invoked, the feasibility is checked again, meaning the technology option selection algorithm is run again. The reason for this is that both technology options and the network are dynamic, and it is possible that a technology option can become infeasible in the time between a Check Order and Realize Order operation.

If the order realized is due to the upgrading of an 'Active' order then the order management system will automatically put the old, parent order in the status 'Upgraded' and the new child order as "Active".

Cancel Order

The Cancel Order operation cancels orders in the queue, or orders which have been constructed, are in fulfillment or are even active. If the order was 'Active', the order is put in the 'Cancelled' state. If the order was in any state previous to 'Active' it is put in the 'Abandoned' state.

To enable the cancellation of an order which is 'Active' (i.e. a live service), the technology options in the product model may specify workflow templates/scripts for a cancel operation.

The Cancel Order stops the fulfillment process for an order which is 'In Progress'. It can be used on orders which are not active, and need to be abandoned by the OM. It halts the order fulfillment process, and puts the projects related to the process in a halted state. Unrolling projects is achieved via the Cancel Order Callout of the OFA adaptor.

Cancelling any order will disallow any further operations against the order, and will prevent any new order from being added to the order chain.

Get Product Details

The Get Product Details operation gets all the details of a given product for use by the order manager to compare against the requirements of an order. It can take either the product ID, or the product name and version ID or version name. It indicates the state of the product and the values of the parameters which are already set by the service components, as well as any objects/values which need to be specified to complete the order. It can optionally report on the technology options available for each service component, if the order management system wants to force through a particular technology option.

Adaptor Events

Adaptor events are used to update the order manager with events within the fulfillment/provisioning system, such as Feasibility Success or Failure, Order Status update, and Parameter Update events:

Status Update—The Status update event notifies the Order Manager of changes in the state of an Order. The event identifies the order to which it applies and may further specify the time and date of the event, the old status, the new status, and the reason for the status change.

Feasibility Check—The Feasibility Check Event tells the Order Manager when the feasibility check is complete, and the status of the check (success or failure). On receiving this event, the order status is placed from 'In Feasibility' to 'Created'.

Parameter Update Event—The Parameter Update Event is used if the order attributes or objects have been changed as part of the order fulfillment. This event internally changes the service component parameters as well. The event provides details of the parameter change to the Order Manager.

Order Details

Order details are received by the OFA in an XML format, specified by an appropriate XML schema.

The order details are given relative to a specific product and its version, and therefore specify all service component parameters which are undefined in the product definition. The order details include:

Where a product includes optional service components, the required service components are specified, For each mandatory service component parameter which is bounded or undefined, a value for the parameter which is within the bounds allowed by the service component, For each non-mandatory service component parameter which is bounded or undefined a value within the bounds can optionally be specified For each modifiable service component parameter (i.e. a parameter with a default value) an alternative value can optionally be specified The technology options selected for each service component can optionally be specified (where selection of specific technology options is to be enforced by the order, rather than being selected by the provisioning process).

Product Details

The Product Details tell the Order Manager about the product breakdown, and are preferably encoded according to an XML schema similar to the Order Details, except that the Product Details documents will include service component parameter values already set by the service components. The Product Details include:

Product Name and ID

Product Provision Status and Resolution Status

Product Type Name and ID

Product Family Name and ID tree and priority within the family

Product Version and Name

All Service Components (Name, Type and ID) forming part of the product along with the following details for each service component: provision status; whether the component is mandatory; number of occurrences; and details of the service component parameters, including for each parameter: any default/preset parameter value or range, whether the parameter is mandatory, and whether it is modifiable.

Figure 18:
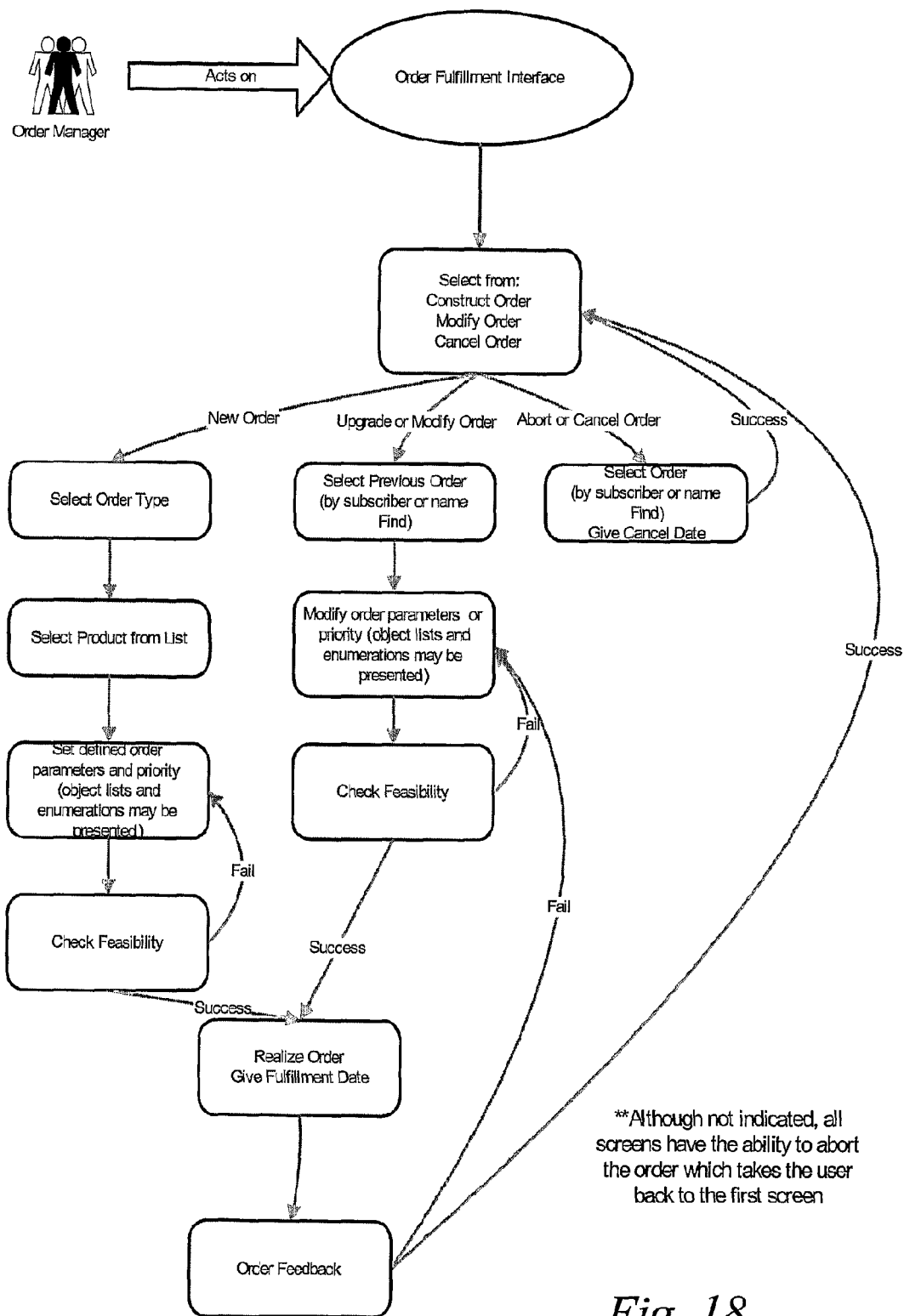
FIG. 18 illustrates the operation of an order fulfillment interface.

Order entry and fulfillment may be performed via a user interface. The operation of an exemplary order fulfillment interface is illustrated in FIG. 18.

Data Model

Figure 19:
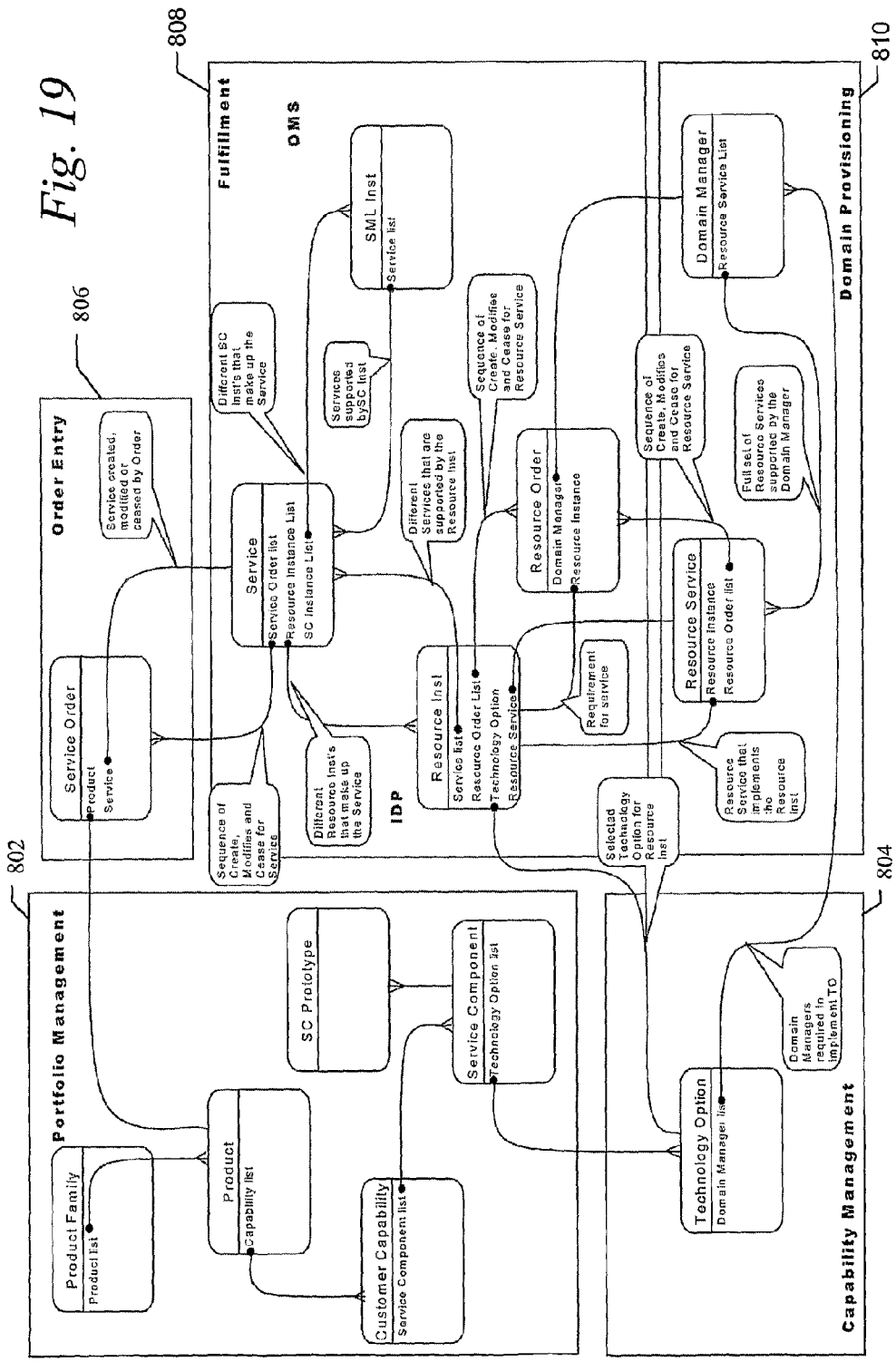
FIG. 19 shows a data model used for implementing the product model.

FIG. 19 shows a data model used in an example implementation of the product model. This is essentially a more detailed version of the high-level data model shown in FIG. 5. The data model includes product data 802, including the product and product family entities defining the available products, and entities representing the capabilities, service components and service component prototypes which define the basic service functionality building blocks. As mentioned previously, end-user (or customer) capabilities could alternatively be modelled as higher-level service components in a service component hierarchy, but have here been modelled as separate entities. Product data 802 is managed by a portfolio management process. Technology data 804 includes the technology options defined for the service components and is managed by a capability management process.

Order data 806 includes the order entities which are created by the order entry process.

Service instance data 808 represents live services (and also services in the process of being provisioned) and includes the service instances corresponding to ordered products, along with resource instances corresponding to the technology options selected to implement service components of the ordered products, and resource orders representing orders to domain managers to implement the resource instances in the network. Service instance data 808 also includes SML instances corresponding to SML components of ordered products. The service instance data is generated during the order fulfillment/provisioning process and provides an inventory of services provided in the network.

Domain data 810 includes low-level provisioning information, in particular resource service entities representing service functionality provided by given network resources in a given technology domain, and domain manager data identifying the domain managers for the technology domains. This data is used by the domain provisioning process.

Use Case

A use case will now be described which illustrates, by way of example, the application of the described product model to a real-world scenario.

One advantage of the product model solution described herein is that it can simplify the product upgrade process, where the time and effort required to deliver a higher value product to the end-user is kept to a minimum. The present use case illustrates this. The use case is concerned with two products: a Voice-over-IP product (VoIP) and a Videophone product (Vp).

The Videophone (Vp) product can be a natural enhancement to a VoIP service. In the present example, the Vp product is targeted at personal, residential use for family and friends. A typical use is to allow grandparents and grandchildren to maintain a more personal contact from their different homes. When both locations have engineered connections to the same service provider, the QoS may be sufficient to allow large screen TVs to be used as wall screens.

The product is based on delivering Vp to the end-user's home computer, set-top box, or specialist CPE. These will typically be variations in the Product Family. Further variations may specify different connection options such as engineered broadband, mobile and access from other service providers through the Internet. Many of the other components, such as security and address book, remain the same, regardless of the connection option.

Other users can connect to the Vp service to create a many-way Vp conversation. A special case is for the end-user himself or herself to access their Vp service from a remote site, to let a mobile worker keep in touch with their family when away from home, for example.

The use case relates to an upgrade from an existing VoIP to a Vp service. The main option for the end-user is whether the Vp shares the VoIP capabilities, or whether it is an independent service with dedicated resources.

For the Vp product, the Public Label component will typically have a more secure 'Private' address option, compared to a fully open one for VoIP, because Vp allows visual access to the end-user's home and family. This address may require callers to be authenticated by the Service Provider in order to gain access, and all such individuals must then be in the end-user's address book. Adding people to the list of authorised callers is the responsibility of the end-user and is managed as an end-user transaction within the Address Book (Content Delivery) component. The service provider guarantees the authorisation function against this list.

The session management for Vp is typically more complex than voice. It may be necessary to have different conditions that determine when to deliver video and when to deliver voice only: for example, a session may start with voice only to confirm the caller's identity.

Product Definitions

The following describes the VoIP and Vp products in terms of their Service Components. These are expressed using the service component prototypes set out above, to give a useful meaning to the product definition and so make the portfolio management process easier to understand.

This example does not consider pure SML components, but looks only at the resource component layer (e.g. connection components and IT components).

The resource management policy illustrated in this use case is one where individual, dedicated resources are assigned for connections that have a different CoS or endpoints. The separate connections allow the telecommunications service to closely manage the capacity through the network. It allows the video and voice payload to be switched at the local metro node, while sending the low bandwidth control channel to a central routing function. It also allows CoS differentiation to be managed in the network, ensuring the extra resources required to deliver real time VBR are not wasted by carrying best efforts UBR traffic.

The following is an example definition of a VoIP Product Family given in terms of (a hierarchy of) Service Components (SP=Service Provider):

Voice connection capability
    Access Connection—Voice—peak rate 20 kbit/s, VBR (rt)
    Connection to domain—SP's VoIP network
Voice Signalling capability
    Access Connection—Control Channel—peak rate 6 kbit/s UBR
    Content Delivery—VoIP Manager
Messaging capability
    Access Connection—Control Channel—peak rate 6 kbit/s UBR
    Content Delivery—VoIP Messenger
Content Delivery—Address Book
Public Label—Public (Level 0)
Authentication—Private (Level 3)

The following is an example definition of a Vp Product Family, again in terms of its constituent Service Components:

Voice connection capability
    Access Connection—Voice—peak rate 20 kbit/s, VBR (rt)
    Connection to domain—SP's VoIP network
Video Telephony connection capability
    Access Connection—Basic Data—230 kbit/s, UBR
    Connection to domain—SP's Vp network (the Access connection is specified to a network domain as the other end-point)
Signalling capability
    Access Connection—Control Channel—peak rate 6 kbit/s UBR
    Content Delivery—Vp Manager
Messaging capability
    Access Connection—Control Channel—peak rate 6 kbit/s UBR
    Content Delivery—Vp Messenger
Content Delivery—Address Book
Public Label—Private (Level 3)
Authentication—Secure (Level 4)

As the above examples show, many of the IT Service Components can be used on their own, without being part of a structured end-user capability. This is usually because they can be accessed through the Internet, or from other carriers. In both cases the service is accessed through a PoP (point-of-presence) and makes use of the Authentication component.

For example, a connection to the Address Book is not specified. It can be reached through the Internet and makes use of the Authentication component to control access.

The Service Components will typically have many other parameters, but this overview restricts itself to a few prominent ones that help in comparing the two products. So in the above, for the Public Label and Authentication components, only a security rating parameter is specified.

The Product Family defines the full set of capabilities with the fullest range of parameters available to the Service Components.

Individual products within the family are subsets of the full capability, likely to be defined with fewer Service Components and more tightly bound parameters. For example an Internet version of the products could be defined with:—

No voice or video connection capability

No Access Connection components for the signalling and messaging capabilities

The Content Delivery components are then instead reached through the Internet, using the Authentication component for access.

The voice and video connection capabilities consist of only a single Access Connection component. The order entry process defines the user-premises end of the connection. The product defines the other end to be either the VoIP or Vp networks. This is equivalent to saying that a PSTN service must connect to a voice switch. There will usually be little or no value in further specifying this within the product definition. The fulfillment process will resolve the network end to a port on a selected edge device within the specified network.

The signalling and messaging have been described here as separate capabilities. This allows them to be delivered from different network locations, using different Content Delivery components. However, an equally valid solution would be to combine both capabilities into a single Manager, with the messenger features as part of the Manager options.

The messaging service will have options for different quality video recordings and different sizes of mailbox. The messages themselves use the VoIP or Vp service to deliver and record messages.

Other, additional capabilities could easily be added to both products as part of the Portfolio Management process. Conferencing is likely to be part of the Manager function, activated by permissions, but an always-on home monitoring function could be another, optional Content Delivery capability.

The Products completely specify the bandwidth and QoS requirements for the connections, so these are not Order options. The requirement for Vp is for a 256 kbit/s connection using two different CoS; UBR and VBR(rt). Note that this is a higher quality service than a broadband 256 kbit/s connection, which will only have UBR CoS.

This bandwidth could be set either by the requirements of the Vp and VoIP applications, or by a predetermined access bandwidth, allocated based on the telecommunications service's policy and available network resources. Some applications may demand higher quality connections than others, but it is usually possible to deliver an application over a predetermined bandwidth as long as the trade-off with quality is understood.

Provisioning

In the present upgrade scenario, the VoIP product is already in place and the set of resources specified for the VoIP service are already allocated to the end-user.

The Order for the Vp product will reach the provisioning system from the Order Entry Process. It contains end-user information identifying the end-user and their location. Existing services and the serving location are identified, typically from a separate network resource/service inventory (e.g. inventory 62, FIG. 1).

In this example, the order specifies whether the end-user wants to share the Vp service with the VoIP, or purchase a second dedicated service. This will not only affect the connection requirements, but also whether additional Label or session management components are required.

The first step is to check the capacity of the existing connection to the end-user. If the existing technology bearer, such as a DSLAM or MSAN connection, has sufficient free capacity to support the new service, the provisioning process will proceed in the resource management layer, and will be dependent on whether the Vp service replaces the existing VoIP, or is a separate, additional service.

New Resource Selection

In principle, the test for available capacity may fail for a number of reasons.

The existing voice service is delivered by PSTN, not VoIP

The existing technology does not have the reach to support the higher bandwidth

Other services, such as a dedicated Internet service, are consuming the bandwidth of the technology bearer For the purposes of this example, it will be assumed that the original voice service is delivered using PSTN, so a new access technology is required.

Referring back to FIG. 6, in this case the IDP layer 380 of the fulfillment process 350 steps through the Technology Options representing the technologies available to support the specified Access Connection Service Component, according to their priority ranking, as recorded in the Service Catalogue 106. IDP 380 identifies the highest-ranked technology that is present at the serving location and is capable of supporting all the existing services, plus the additional Vp service.

In the current example, MSAN is the highest-priority technology and is capable of delivering the Vp service.

The Management Model 382 is tested to see if an MSAN is present at the exchange serving the end-user. In this example, the model states that it is not.

ADSL is the second choice after MSAN (according to the priorities specified for the Technology Options in the service catalogue) and is capable of satisfying the Vp product requirement. IDP 380 therefore selects this as the technology to implement the Service Component at the end-user site. Note that the Vp product is symmetric, but ADSL is an asymmetric service. IDP will therefore need to ensure that the necessary upstream bandwidth is available.

xDSL technologies have limited reach, so there is an additional requirement to qualify the end-user premises. This is a test function, which may be carried out in advance (pre-qualification), or on demand. There are options as to how the results of the qualification test can be used in the provisioning process. The test systems may be directly queried, or the data may be held in IDP's Management Model 382. The second option is preferred for efficiency. The qualification step is required to confirm the bandwidth available to the end-user premises.

In most cases, the DSLAM will have been deployed with a connection to the ISP, so it is only necessary to adapt the Access Connection into the appropriate ATM VP (Virtual Path) to provide connectivity to the Service Provider of the Vp service.

The existing PSTN service would also need to be ceased.

If in the above example ADSL were not available, then IDP 380 would preferably report back to the order entry process 360 that the required service is not available. IDP 380 may be able to offer a lower quality service, based on the available technology and the Service Components that the technology supports. For example, IDP could offer back a restricted QoS service over an existing ISDN connection, assuming that the technology was present at the serving site.

Implementing Vp as a Service Upgrade

In this scenario, Vp replaces the VoIP service.

The end-user can choose to keep the same Public Label as the previous VoIP service, but in this example the security level of the Label is upgraded to 'Private', which restricts callers to a known list within the address book and requires them to authenticate themselves. This means it may be preferable to have a separate Label for the Vp service and continue to use the existing Label for voice-only calls.

Choices of this kind may be Order Entry options for a product, or may be expressed as separate products in the product model, depending on requirements. For example, a separate 'Private' Vp product could be defined within the Vp family, which could also be used to package together other desirable features for such a service.

The security level of the Authentication component should be higher than that of the Label component, because Authentication gives administration rights over the service. This is therefore upgraded to 'Secure'. The requirement for this change comes directly from the product definition. A relationship (or constraint) is defined between the security parameters of the Public Label and Authentication components which forces the Authentication component's security level to be greater than that of the Label component. This relationship is typically defined in the Product Family.

These upgrades are provisioned by an Authentication Domain, within the IT platform. IDP 380 will direct the Resource Order to the correct platform using information from the existing service.

The Address Book capability continues as before. This may be based on a combination rule defined in the Service Component, e.g.:

Combining two products, each of which defines an Address Book, results in a single Address Book.

The VoIP signalling capability is ceased and a new Vp capability is provisioned. This will include support for voice-only calls as part of its session management. The design decision comes from a combination rule defined for these Service Components, e.g.:

Combining two products with a VoIP Manager and Vp Manager results in a requirement for a Vp Manager These are examples where Service Components should preferably have explicit comparator relationships (see above).

The voice connection continues as before.

A video telephony connection is ordered from the video platform, with the end-user location information that is received from the Order, or using the service inventory of the existing VoIP service.

The above, simplified overview of the provisioning process illustrates how rules stored within the product model and the IDP provisioning system can automate product upgrades and make use of reusable resource capacity.

The results of the IDP design process 380 are either new, or modified Resource Instances (see FIG. 8). An existing resource may need to be enhanced to support higher maximal values for certain parameters in order to support additional services. For example, if the bandwidth requirements for the Vp voice connection where higher than for VoIP voice connection, then that Resource Instance would need to be enhanced from the 20 kbit/s value.

IDP 380 will send out technology specific orders to DMs 390 as a result of the design process. This will order changes to each of the technology domains, to reflect the changes in the Resource Instances modelled in IDP.

IDP will message back to the SML 370 once all the orders have been accepted and validated by the DMs 390. This will usually not indicate completion of the orders, but that the orders can be completed.

On completion of all the Orders within the DMs 390, the DMs will return the specific end ports and frame appearances for the connection components and server platforms for the IT components. IDP will message back to the SML 370 and add the additional detail to its service model. In this specific use case, no physical changes to the service end-points are needed, but additional data channels and IT components will be allocated.

Progressing Vp as an Additional Service

If the Vp is an additional service, all new Service Components need to be provisioned.

The Address Book is an exception as the end-user may choose to maintain a single Address Book for all their services. Vp will appear as an additional option in the Address Book, to allow the end-user to give individuals access to their Vp service.

The underlying technology bearer of the Access Connection Service Components, typically from a DSLAM or MSAN, will continue to be used. These technologies have bandwidth ceilings of over 8 Mbit/s, so there will be sufficient headroom for the additional Resource Instances on the existing technology bearers. In this situation, new connections will be provisioned that occupy their own bandwidth within the bearer. This means there will be a dedicated channel for the VoIP service and the voice component of the Vp service, so that both can be used simultaneously.

It may be that the additional, dedicated service requires greater bandwidth than the technology can carry. This may be because of reach problems limiting the available bandwidth of the technology. In this case, it may be possible to reuse the existing physical bearer, the copper pair, but connect to a more capable technology.

SUMMARY

The product modelling approach described above seeks to model telecommunications products in three layers. The aim is to separate (by loose coupling) products offered into the market from the technologies that are used to deliver them. One result of this approach to product modelling can be the removal of unnecessary dependencies between products and technologies. Each can be changed and optimised independently, without the risk and complexity of disrupting the other.

The first layer consists of the telecommunications Products which are offered into the market place. The products are created by a portfolio management process. There may be an arbitrarily large number of these, to suit each market condition, potentially even focusing in on the individual end-user.

The next layer is composed of Service Components. These are a small and stable set of fundamental capabilities of the telecommunications service that can be mixed, matched and parameterised to create any product offering. Service Components precisely define the capability end-users receive from the telecommunications service. Individual components map onto the layering in the fulfillment process; either to the service management layer (SML), or to the resource provisioning layer, which manages network and IT technologies. Usually, no component spans both, giving a clear separation of responsibility between user-facing components and those that consume network resources. This can free resource management processes to achieve optimised utilisation of resources using automated inventory management techniques.

Products, and their Service Components, are modelled in a way that conveys what they do for the end-user, rather than the technology with which they are implemented. This enables portfolio managers to define products in terms which are meaningful to end-users. The end-user is not forced to select technology options that they neither understand, nor care about.

Technology Options form the third layer in the product model. They define technologies in terms of the extent to which they are usable for implementing a Service Component. The service provider can then compare different technologies on a like-for-like basis and see directly the value of its resource investments to end-users.

This product modelling approach can be applied to a wide range of telecommunications services, but is particularly suited to services involving media-rich Next Generation Networks (NGNs). These combine data networks with IT servers to form Information and Communication Technology (ICT) platforms that deliver media-rich content to the end-user. This can lead to a significant increase in the complexity of both product management and fulfillment. The product modelling approach described here can help to reduce this complexity and can enable the use of efficient, highly manageable data driven processes within both product management and fulfillment processes.

Furthermore, automation of the provisioning process can be enhanced by defining standard, re-usable provisioning processes for the defined Service Components.

In addition to these general advantages, the product modelling approach described herein can have a number of more specific benefits, both to the end-user of the telecommunications service and to the service operator. Advantages to the end-user can include:

Product definition can be focused on individual end-user lifestyle and requirements (a 'market of one')

End-users can be provided with an easy route to enhance their services, controlling the ordering/upgrade processes themselves without the need for truck-roll appointments.

New technologies can be rapidly built into existing products, to improve QoS.

Provision and repair times can be reduced, because alternative technology options can be made available Additionally, benefits to the service operator can include:

Products can be built up quickly, by combining predefined Service Components, to meet changing market needs The cost and performance of Products can be estimated accurately as they are created from known, reusable components.

There can be a high degree of confidence that Products defined in this way can be operated efficiently by the telecommunications service, for the same reason.

The provisioning system is free to use the most cost-effective technology to meet the SLA.

The utilisation of network resources can be increased

There can be a broader choice of technologies for implementing a given product, which can decrease the average time needed to deliver and repair a service.

End-user services can be enhanced incrementally rather than requiring manual cease and re-provide upgrades.

New technologies can be introduced to reduce cost of service delivery of existing products (rather than being launched as separate products that compete for market share with existing products).

In addition to the provisioning of services, the product model can also support other functions in the telecommunications service, such as a service assurance process for measuring whether actual services provided to the end-user correspond in quality to an ordered product. For example, the service assurance process could use the SLA component (e.g. a bandwidth parameter) of the product definition to determine the response to alarms generated by the network resources as well as to problem reports generated by a service management system.

It will be understood that the present invention has been described above purely by way of example, and modification of detail can be made within the scope of the invention.

The invention claimed is:

1. A system, comprising:
    a service information database defining:
        a plurality of service components, each service component representing functionality that can be provided by network resources in a telecommunications network; and
        a plurality of user services; each user service representing a service which can be provided to users of the telecommunications network and being associated in the database with one or more of the plurality of service components, the one or more associated service components specifying the service functionality of the user service;
    the system further comprising:
        an order interface adapted to receive a service order relating to a given user service;
        a plurality of domain managers for managing technology resources of respective network technology domains; and
        a provisioning component adapted to access the service information database; identify one or more service components associated with the given user service; and, for each identified service component, select an implementation technology usable for providing the service functionality represented by the service component and issue a command to the domain manager associated with the selected implementation technology to configure one or more network resources to provide the service functionality;
        wherein the provisioning component is adapted to select the implementation technology in dependence on priority information defined for available implementation technologies;
        wherein at least one of the plurality of service components is associated with a plurality of alternative implementation technologies including a first alternative implementation technology and a second alternative implementation technology, and where a higher priority is assigned to the second alternative implementation technology than the first alternative implementation technology, in order to assist in a phasing out of the first alternative implementation technology.

2. A system according to claim 1, wherein the service information database further defines one or more of the alternative implementation technologies associated with each service component, the provisioning component being adapted to select an implementation technology for a given service component from the alternative implementation technologies defined for the service component in the database.

3. A system according to claim 1, wherein the provisioning component is adapted to select the implementation technology in dependence on network resources available at a serving location at which the service is to be provided.

4. A system according to claim 1, wherein the service order specifies one or more requirements for the service, the provisioning component being adapted to select the implementation technology in dependence on the ability of available implementation technologies to fulfill the specified service requirements.

5. A system according to claim 1, wherein the provisioning component is adapted, for each identified service component, to retrieve provisioning information, the provisioning information specifying a process for configuring one or more network resources of the selected implementation technology to provide the functionality represented by the service component, the provisioning component being adapted to provision the service component in accordance with the provisioning information.

6. A system according to claim 5, wherein the provisioning information comprises a script, the provisioning component being adapted to execute the script.

7. A system according to claim 5, wherein the provisioning information is stored in the service information database and is associated in the database with one or more of the implementation technology and the service component to which it relates.

8. A system according to claim 1, wherein the provisioning component is adapted to coordinate the provisioning of different service components in the respective technology domains of the selected implementation technologies.

9. A system according to claim 1, wherein the provisioning component is adapted to perform additional configuration to connect network resources of different technology domains.

10. A system according to claim 1, further comprising a service inventory database comprising one or more of data defining provisioned services and services being provisioned, the provisioning component being adapted to modify the service inventory database in response to the provisioning of the service order.

11. A system according to claim 10, wherein the provisioning component is adapted to create a service instance entity in the service inventory representing the instance of the user service being provisioned.

12. A system according to claim 10, wherein the provisioning component is adapted to create a resource instance entity in the service inventory for each service component being provisioned, each resource instance entity representing the network resources of the selected implementation technology being used to provision the service component.

* * * * *